US012665642B2

(12) United States Patent
Abotabl et al.

(10) Patent No.: US 12,665,642 B2
(45) Date of Patent: Jun. 23, 2026

(54) CRITERION-TRIGGERED CHANNEL STATE INFORMATION REPORTING CONFIGURATION

(71) Applicant: QUALCOMM Incorporated, San Diego, CA (US)

(72) Inventors: Ahmed Attia Abotabl, San Diego, CA (US); Marwen Zorgui, San Diego, CA (US); Muhammad Sayed Khairy Abdelghaffar, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 431 days.

(21) Appl. No.: 18/162,827

(22) Filed: Feb. 1, 2023

(65) Prior Publication Data

US 2024/0259061 A1 Aug. 1, 2024

(51) Int. Cl.
| | |
|---|---|
| *H04W 24/10* | (2009.01) |
| *H04B 7/06* | (2006.01) |
| *H04L 5/00* | (2006.01) |
| *H04W 52/32* | (2009.01) |
| *H04W 52/36* | (2009.01) |

(52) U.S. Cl.
CPC ......... *H04B 7/0626* (2013.01); *H04L 5/0051* (2013.01); *H04W 52/325* (2013.01); *H04W 52/36* (2013.01)

(58) Field of Classification Search
CPC ... H04B 7/0626; H04B 7/0645; H04L 1/0026; H04L 1/0027; H04L 1/0031; H04L 5/0051; H04W 24/10; H04W 52/325; H04W 52/36; H04W 52/362
See application file for complete search history.

(56) References Cited

U.S. PATENT DOCUMENTS

| | | | | |
|---|---|---|---|---|
| 2013/0148611 A1* | 6/2013 | Moulsley | .............. | H04W 72/23 |
| | | | | 370/329 |
| 2015/0289155 A1* | 10/2015 | Gao | ........................ | H04L 5/005 |
| | | | | 370/252 |
| 2018/0069612 A1* | 3/2018 | Yum | ..................... | H04L 5/0091 |
| 2019/0058517 A1* | 2/2019 | Kang | ..................... | H04L 5/0094 |
| 2021/0266926 A1* | 8/2021 | Gao | ..................... | H04L 5/0094 |
| 2022/0256387 A1* | 8/2022 | Xiao | ..................... | H04L 5/0035 |
| 2023/0318687 A1* | 10/2023 | Kim | .................. | H04B 7/06968 |
| | | | | 370/329 |
| 2024/0171332 A1* | 5/2024 | Kwak | .................. | H04L 5/0048 |

(Continued)

FOREIGN PATENT DOCUMENTS

WO 2022191760 A1 9/2022

OTHER PUBLICATIONS

International Search Report and Written Opinion—PCT/US2024/011366—ISA/EPO—May 14, 2024.

(Continued)

*Primary Examiner* — Phuc H Tran
(74) *Attorney, Agent, or Firm* — Dinsmore & Shohl LLP

(57) ABSTRACT

Various aspects of the present disclosure generally relate to wireless communication. In some aspects, a user equipment (UE) may receive information indicating a criterion and a configuration for channel state information (CSI) reporting linked to the criterion. The UE may transmit, based at least in part on the criterion being satisfied, CSI reporting using the configuration. Numerous other aspects are described.

12 Claims, 12 Drawing Sheets

(56)                    References Cited

U.S. PATENT DOCUMENTS

2024/0396606 A1*  11/2024  Hu ........................ H04B 7/0626
2024/0422608 A1*  12/2024  Li .......................... H04W 24/02
2025/0106673 A1*   3/2025  Ma ....................... H04W 72/231
2025/0125853 A1*   4/2025  Tang ..................... H04B 7/0626
2025/0141515 A1*   5/2025  Lee ...................... H04B 17/373
2025/0184070 A1*   6/2025  Ma .................... H04W 52/0206

OTHER PUBLICATIONS

Moderator (Huawei): "FL Summary#1 for Spatial and Power Domain
Techniques for R18 NES", 3GPP TSG-RAN WG1 Meeting #112bis-
e, R1-2303913, 3rd Generation Partnership Project (3GPP), Mobile
Competence Centre, 650, Route Des Lucioles, F-06921, Sophia-
antipolis Cedex, France, vol. Ran WG1, No. e-Meeting, Apr. 17,
2023-Apr. 26, 2023, Apr. 17, 2023, XP052422643, 77 Pages.

* cited by examiner

FIG. 5

Receive information indicating a criterion and a configuration for channel state information (CSI) reporting linked to the criterion

910

Transmit, based at least in part on the criterion being satisfied, CSI reporting using the configuration

920

900

1010 Output information indicating a criterion and a configuration for CSI reporting linked to the criterion 1020 Obtain CSI reporting in accordance with the configuration

1000

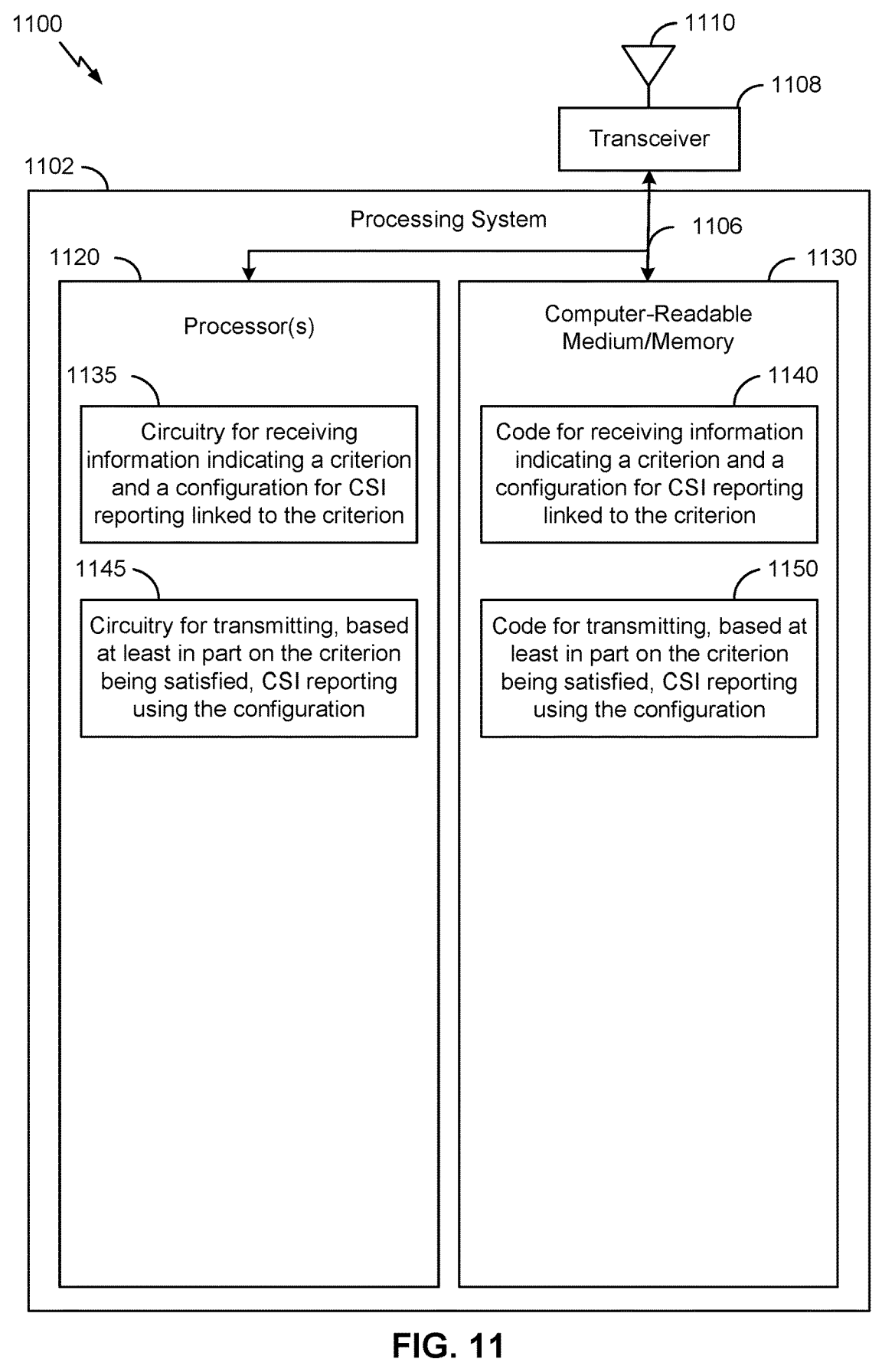

1100

1110

1108

Transceiver

1102

Processing System

1106

1120

1130

Processor(s)

Computer-Readable
Medium/Memory

1135

Circuitry for receiving
information indicating a criterion
and a configuration for CSI
reporting linked to the criterion

1140

Code for receiving information
indicating a criterion and a
configuration for CSI reporting
linked to the criterion

1145

Circuitry for transmitting, based
at least in part on the criterion
being satisfied, CSI reporting
using the configuration

1150

Code for transmitting, based at
least in part on the criterion
being satisfied, CSI reporting
using the configuration

FIG. 11

CRITERION-TRIGGERED CHANNEL STATE INFORMATION REPORTING CONFIGURATION

FIELD OF THE DISCLOSURE

Aspects of the present disclosure generally relate to wireless communication and to techniques and apparatuses for a criterion-triggered channel state information (CSI) reporting configuration.

BACKGROUND

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users.

Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and types of wireless communications mediums available for use, and the like. Consequently, there exists a need for further improvements in wireless communications systems to overcome the aforementioned technical challenges and others.

SUMMARY

Some aspects described herein relate to a method of wireless communication performed by a user equipment (UE). The method may include receiving information indicating a criterion and a configuration for CSI reporting linked to the criterion. The method may include transmitting, based at least in part on the criterion being satisfied, CSI reporting using the configuration.

Some aspects described herein relate to a method of wireless communication performed by a network entity. The method may include outputting information indicating a criterion and a configuration for CSI reporting linked to the criterion. The method may include obtaining CSI reporting in accordance with the configuration.

Other aspects provide: an apparatus operable, configured, or otherwise adapted to perform any one or more of the aforementioned methods and/or those described herein with reference to and as illustrated by the drawings; a non-transitory, computer-readable medium comprising computer-executable instructions that, when executed by a processor of an apparatus, cause the apparatus to perform the aforementioned methods and/or those described herein with reference to and as illustrated by the drawings; a computer program product embodied on a computer-readable storage medium comprising code for performing the aforementioned methods and/or those described herein with reference to and as illustrated by the drawings; and/or an apparatus comprising means for performing the aforementioned methods and/or those described herein with reference to and as illustrated by the drawings. By way of example, an apparatus may comprise a processing system, a device with a processing system, or processing systems cooperating over one or more networks.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating an example of network operations to reduce energy consumption, in accordance with the present disclosure.

FIG. 11 is a diagram illustrating an example of an implementation of code and circuitry for a communications device, in accordance with the present disclosure.

DETAILED DESCRIPTION

Figure 1:
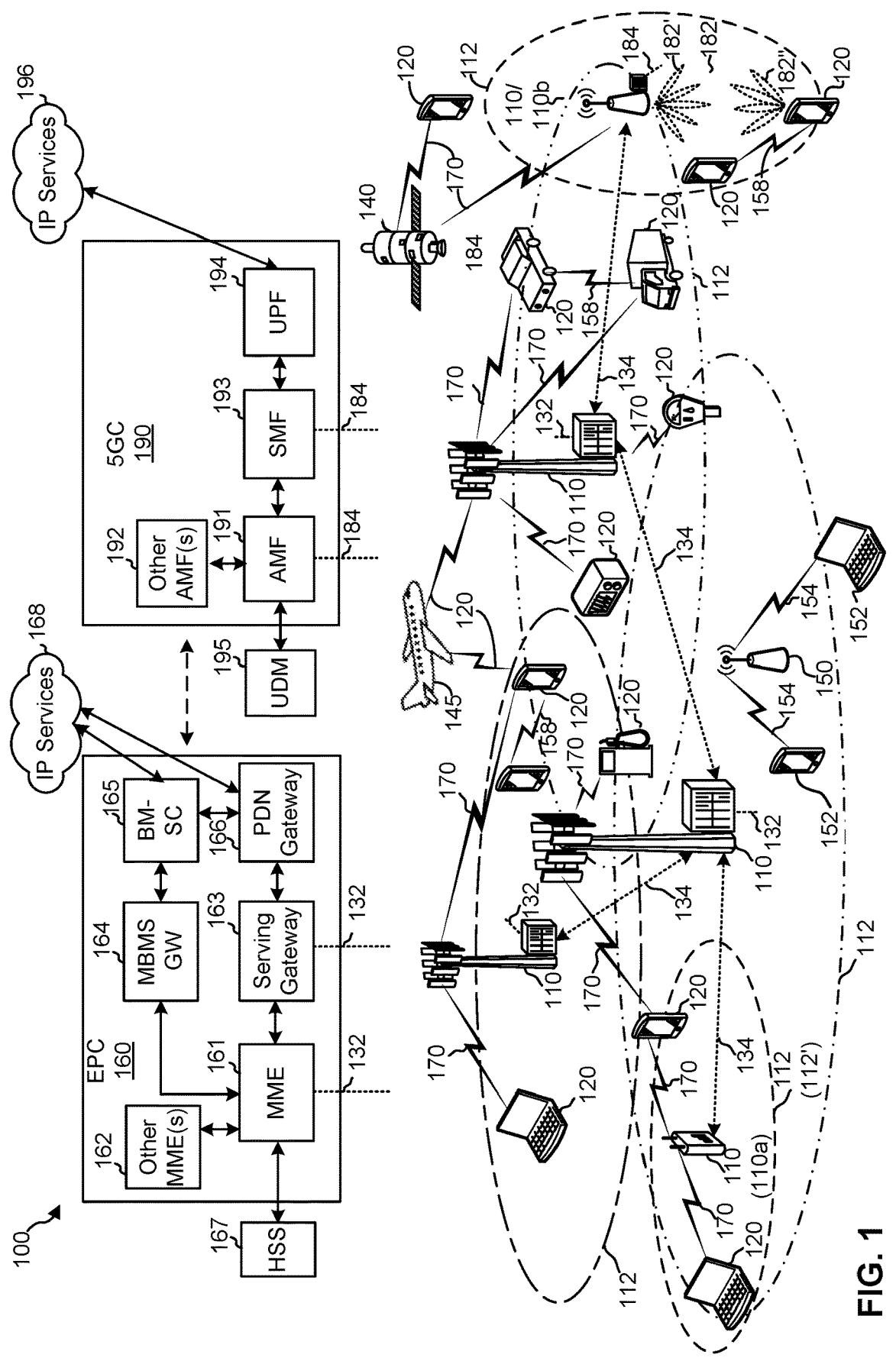
FIG. 1 depicts an example of a wireless communications network, in accordance with the present disclosure.

Aspects of the present disclosure provide apparatuses, methods, processing systems, and computer-readable mediums for a criterion-triggered channel state information (CSI) reporting configuration.

A network entity (e.g., a gNB, a base station, a radio unit) may transmit a reference signal, such as a CSI reference signal, to facilitate determination of CSI by UEs that receive the CSI. For example, a UE may measure the CSI and may derive information regarding a channel between the UE and the network entity from the measurement of the CSI. The UE may report such information to the network entity via CSI reporting, such as via one or more CSI reports. As used herein, "CSI reporting" can include the transmission of CSI derived from a CSI reference signal and/or the derivation of the CSI from the measurement of the CSI reference signal. CSI reporting may be performed according to a CSI report configuration (sometimes referred to as a CSI reporting setting). The CSI report configuration may indicate (directly or by reference to another configuration) a resource that the UE is to measure to derive CSI, as well as parameters that indicate how the CSI reference signal is transmitted and how the CSI reference signal is to be measured, such that the UE can derive the CSI according to a mutual understanding (with the network entity) of the parameters and the measurement of the CSI.

In some circumstances, a configuration of a network entity, relating to transmission of a CSI reference signal, can change dynamically or semi-statically. For example, a network energy savings operation (e.g., a "green network" state) of the network entity may lead to a change in a transmit power of the network entity, a number of antenna elements or antenna panels used by the network entity to transmit a CSI reference signal, or the like. If the UE uses a fixed CSI reporting configuration (e.g., a CSI reporting configuration that provides the same measurement and reporting parameters irrespective of a state of the network entity) to perform CSI reporting, despite parameters of transmission of a CSI reference signal changing at the network entity, then the accuracy and usability of CSI may be degraded. However, reconfiguring the CSI reporting configuration each time the configuration of the network entity changes may be cumbersome and may lead to significant signaling and overhead, and may be infeasible in some situations. Furthermore, changes in the network entity's parameters for transmission of CSI reference signaling may lead the UE and the network entity to use different parameters for transmission and measurement of CSI reference signaling. In some aspects, the transmit power of the network entity may dynamically decrease without the UE adjusting the UE's parameters for measurement of CSI reference signaling, leading to inaccurate channel information on the time scale of dynamic adjustments of the network entity's parameters for transmission.

Some techniques described herein provide signaling of a configuration for CSI reporting and a criterion. For example, the criterion and the configuration may be linked to one another. If the criterion is satisfied (which may for example, occur if there is a change in the configuration used by the network entity to transmit a CSI reference signal), the UE may transmit CSI reporting using the configuration. Thus, the UE may take into account the criterion when transmitting CSI reporting, which reduces overhead and signaling burden for the UE and the network entity in comparison to explicitly reconfiguring the CSI reporting in view of the change in the configuration used to transmit the CSI reference. Some techniques described herein provide a criterion indicating a physical downlink shared channel (PDSCH) decoding threshold. If the PDSCH decoding threshold is satisfied (which may for example, occur due to a dynamic decrease in transmit power of the network entity), the UE may switch to a configuration linked to the criterion. Thus, accuracy of channel information is improved by linking a configuration (which may be suited to CSI reference signal measurement in view of the dynamic decrease in transmit power of the network entity) to a PDSCH decoding threshold criterion (which may provide an indication that the dynamic decrease has occurred without explicit signaling or reconfiguration).

Various aspects of the disclosure are described more fully hereinafter with reference to the accompanying drawings. This disclosure may however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 depicts an example of a wireless communications network 100, in accordance with the present disclosure.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 110), and non-terrestrial aspects, such as satellite 140 and aircraft 145, which may include network entities on-board (e.g., one or more BSs) capable of communicating with other network elements (e.g., terrestrial BSs) and UEs.

In the depicted example, wireless communications network 100 includes BSs 110, UEs 120, and one or more core networks, such as an Evolved Packet Core (EPC) 160 and 5G Core (5GC) 190, which interoperate to provide communications services over various communications links, including wired and wireless links.

FIG. 1 depicts various example UEs 120, which may include a cellular phone, a smart phone, a session initiation protocol (SIP) phone, a laptop, a personal digital assistant (PDA), a satellite radio, a global positioning system (GPS), a multimedia device, a video device, a digital audio player, a camera, a game console, a tablet, a smart device, a wearable device, a vehicle, an electric meter, a gas pump, a kitchen appliance, a healthcare device, an implant, a sensor/ actuator, a display, an internet of things (IoT) device, an always on (AON) device, an edge processing device, or another similar device. A UE 120 may also be referred to as a mobile device, a wireless device, a wireless communication device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, or a handset, among other examples.

BSs 110 may wirelessly communicate with (e.g., transmit signals to or receive signals from) UEs 120 via communications links 170. The communications links 170 between BSs 110 and UEs 120 may carry uplink (UL) (also referred to as reverse link) transmissions from a UE 120 to a BS 110 and/or downlink (DL) (also referred to as forward link) transmissions from a BS 110 to a UE 120. The communications links 170 may use multiple-input and multiple-output (MIMO) antenna technology, including spatial multiplexing, beamforming, and/or transmit diversity in various aspects.

A BS 110 may include, for example, a NodeB, an enhanced NodeB (eNB), a next generation enhanced NodeB (ng-eNB), a next generation NodeB (gNB or gNodeB), an access point, a base transceiver station, a radio base station, a radio transceiver, a transceiver function, a transmission reception point, and/or others. A BS 110 may provide communications coverage for a respective geographic coverage area 112, which may sometimes be referred to as a cell, and which may overlap in some cases (e.g., a small cell provided by a BS 110a may have a coverage area 112' that overlaps the coverage area 112 of a macro cell). A BS 110 may for example, provide communications coverage for a macro cell (covering a relatively large geographic area), a pico cell (covering a relatively smaller geographic area, such as a sports stadium), a femto cell (covering a relatively smaller geographic area (e.g., a home)), and/or other types of cells.

Figure 3:
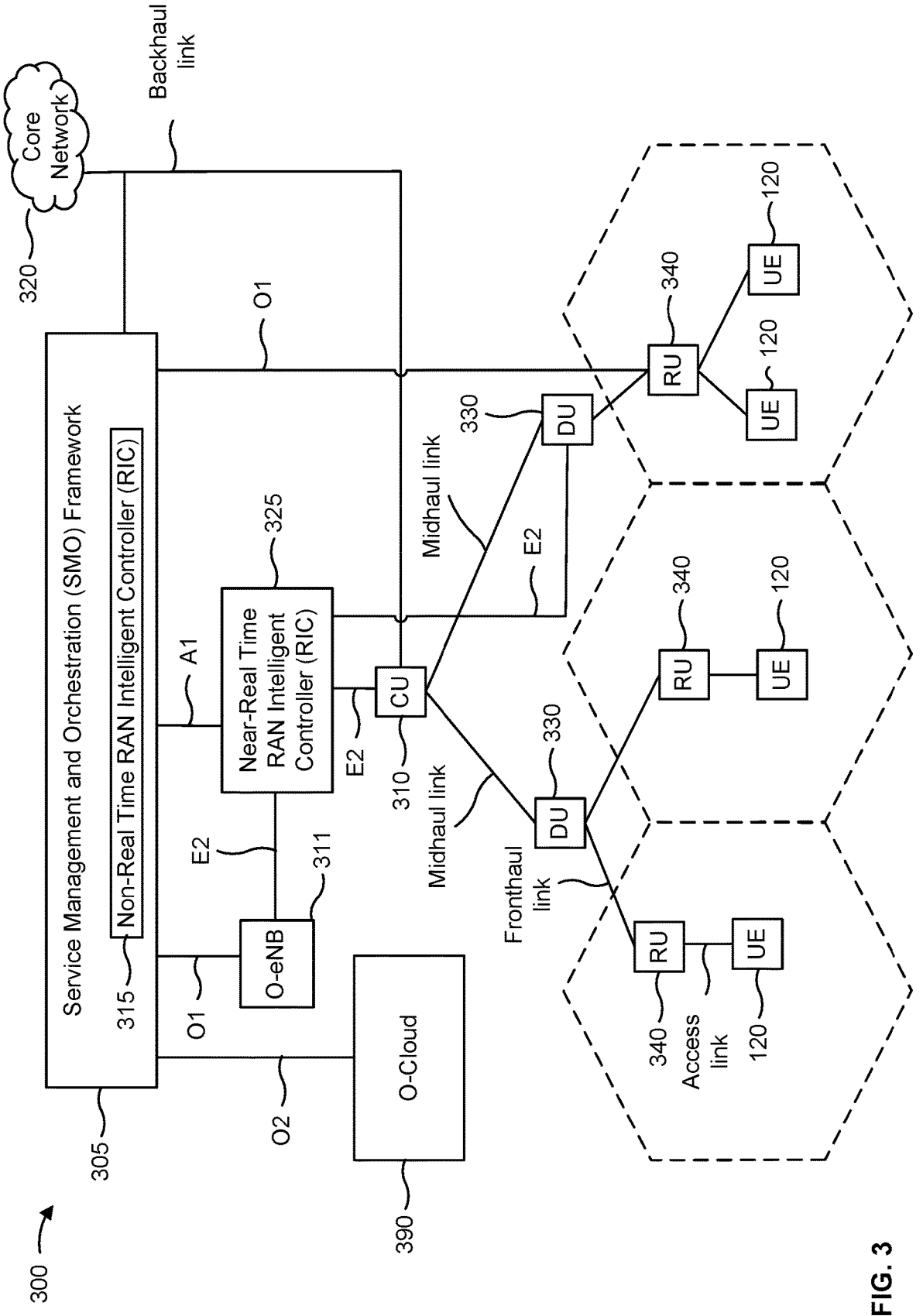
FIG. 3 depicts an example disaggregated base station architecture.

While BSs 110 are depicted in various aspects as unitary communications devices, BSs 110 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a BS (e.g., BS 110) may include components that are located at a single physical location or components located at various physical locations. In examples in which a BS includes components that are located at various physical locations, the various components may each perform functions such that, collectively, the various components achieve functionality that is similar to a BS that is located at a single physical location. In some aspects, a BS including components that are located at various physical locations may be referred to as having a disaggregated radio access network architecture, such as an Open RAN (O-RAN) architecture or a Virtualized RAN (VRAN) architecture. FIG. 3 depicts and describes an example disaggregated BS architecture.

Different BSs 110 within wireless communications network 100 may also be configured to support different radio access technologies, such as 3G, 4G, and/or 5G, among other examples. For example, BSs 110 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 110 configured for 5G (e.g., 5G NR or Next Generation RAN (NG-RAN)) may interface with 5GC 190 through second backhaul links 184. BSs 110 may communicate directly or indirectly (e.g., through the EPC 160 or 5GC 190) with each other over third backhaul links 134 (e.g., X2 interfaces), which may be wired or wireless.

Wireless communications network 100 may subdivide the electromagnetic spectrum into various classes, bands, channels, or other features. In some aspects, the subdivision is based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHz, which is sometimes referred to (interchangeably) as a "millimeter wave" ("mmW" or "mmWave"). A base station configured to communicate using mmWave or near mmWave radio frequency bands (e.g., a mmWave base station such as BS 110*b*) may utilize beamforming (e.g., as shown by 182) with a UE (e.g., 120) to improve path loss and range.

The communications links 170 between BSs 110 and, for example, UEs 120, may be through one or more carriers, which may have different bandwidths (e.g., 5 MHz, 10 MHz, 15 MHz, 20 MHz, 100 MHz, 400 MHz, and/or other bandwidths), and which may be aggregated in various aspects. Carriers may or may not be adjacent to each other. In some examples, allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., base station 110*b* in FIG. 1) may utilize beamforming with a UE 120 to improve path loss and range, as shown at 182. For example, BS 110*b* and the UE 120 may each include a plurality of antennas, such as antenna elements, antenna panels, and/or antenna arrays to facilitate the beamforming. In some cases, BS 110*b* may transmit a beamformed signal to UE 120 in one or more transmit directions 182'. UE 120 may receive the beamformed signal from the BS 110*b* in one or more receive directions 182". UE 120 may also transmit a beamformed signal to the BS 110*b* in one or more transmit directions 182". BS 110*b* may also receive the beamformed signal from UE 120 in one or more receive directions 182'. BS 110*b* and UE 120 may then perform beam training to determine the best receive and transmit directions for each of BS 110*b* and UE 120. Notably, the transmit and receive directions for BS 110*b* may or may not be the same. Similarly, the transmit and receive directions for UE 120 may or may not be the same.

Wireless communications network 100 further includes a Wi-Fi access point (AP) 150 in communication with Wi-Fi stations (STAs) 152 via communications links 154 in, for example, a 2.4 GHz and/or 5 GHz unlicensed frequency spectrum.

Certain UEs 120 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 161, other MMEs 162, a Serving Gateway 163, a Multimedia Broadcast Multicast Service (MBMS) Gateway 164, a Broadcast Multicast Service Center (BM-SC) 165, and/or a Packet Data Network (PDN) Gateway 166, such as in the depicted example. MME 161 may be in communication with a Home Subscriber Server (HSS) 167. MME 161 is a control node that processes the signaling between the UEs 120 and the EPC 160. Generally, MME 161 provides bearer and connection management.

Generally, user Internet protocol (IP) packets are transferred through Serving Gateway 163, which is connected to PDN Gateway 166. PDN Gateway 166 provides UE IP address allocation as well as other functions. PDN Gateway 166 and the BM-SC 165 are connected to IP Services 168, which may include, for example, the Internet, an intranet, an IP Multimedia Subsystem (IMS), a Packet Switched (PS) streaming service, and/or other IP services.

BM-SC 165 may provide functions for MBMS user service provisioning and delivery. BM-SC 165 may serve as an entry point for content provider MBMS transmission, may be used to authorize and initiate MBMS Bearer Services within a public land mobile network (PLMN), and/or may be used to schedule MBMS transmissions. MBMS Gateway 164 may distribute MBMS traffic to the BSs 110 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 191, other AMFs 192, a Session Management Function (SMF) 193, and a User Plane Function (UPF) 194. AMF 191 may be in communication with Unified Data Management (UDM) 195.

AMF 191 is a control node that processes signaling between UEs 120 and 5GC 190. AMF 191 provides, for example, quality of service (QoS) flow and session management.

IP packets are transferred through UPF 194, which is connected to the IP Services 196, and which provides UE IP address allocation as well as other functions for 5GC 190. IP Services 196 may include, for example, the Internet, an intranet, an IMS, a PS streaming service, and/or other IP services.

In various aspects, a network entity or network node can be implemented as an aggregated base station, a disaggregated base station, a component of a base station, an integrated access and backhaul (IAB) node, a relay node, a sidelink node, a transmission reception point (TRP), or a combination thereof, to name a few examples.

As indicated above, FIG. 1 is provided as an example. Other examples may differ from what is described with regard to FIG. 1.

Figure 2:
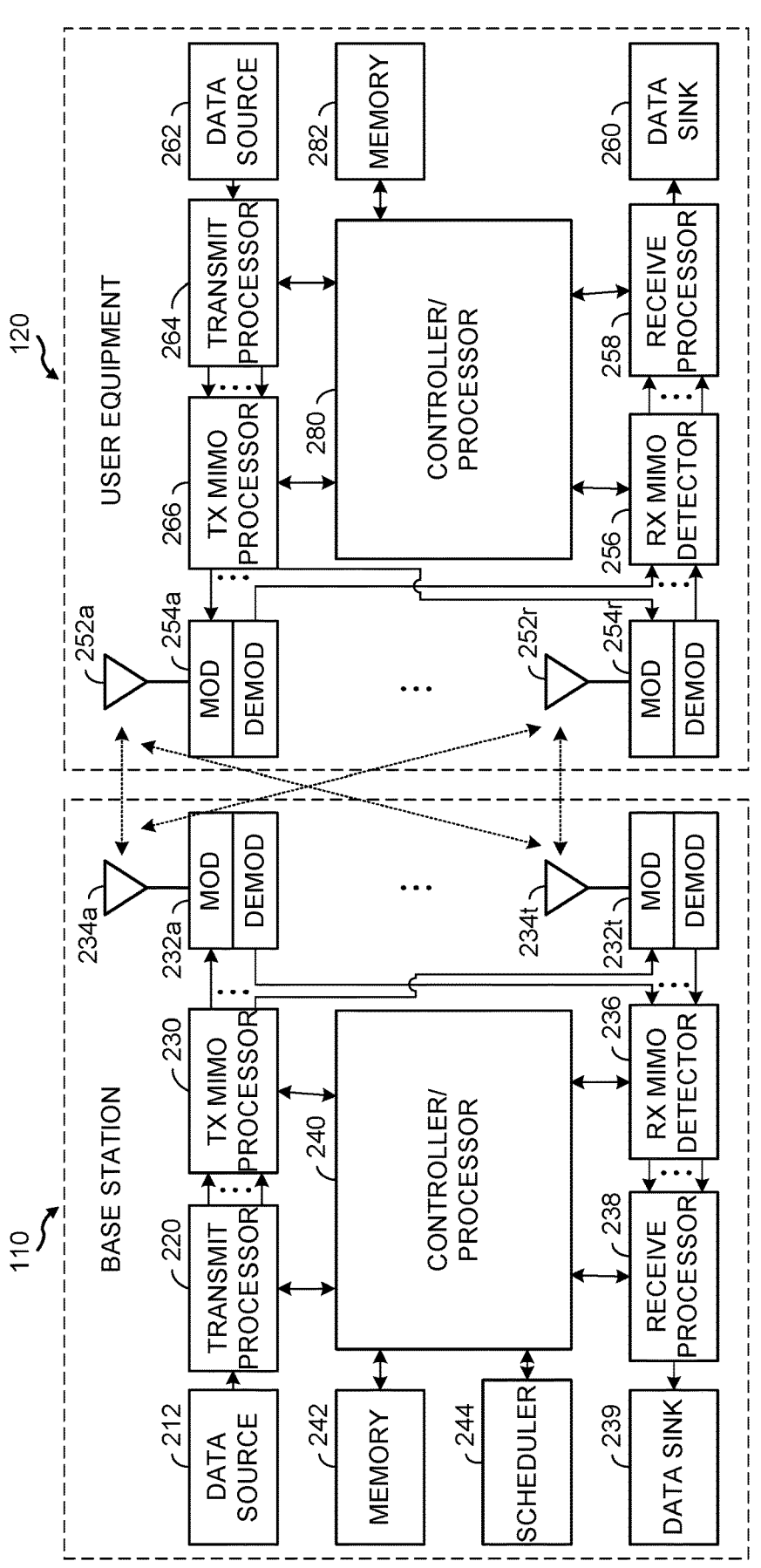
FIG. 2 depicts aspects of an example base station (BS) and user equipment (UE), in accordance with the present disclosure.

FIG. 2 depicts aspects of an example BS 110 and UE 120, in accordance with the present disclosure.

Generally, BS 110 includes various processors (e.g., 220, 230, 238, and 240), antennas 234*a-t* (collectively 234), transceivers 232*a-t* (collectively 232), which include modulators and demodulators, and other aspects, which enable wireless transmission of data (e.g., data source 212) and wireless reception of data (e.g., data sink 239). For example, BS 110 may send and receive data between BS 110 and UE 120. BS 110 includes controller/processor 240, which may be configured to implement various functions described herein related to wireless communications.

Generally, UE 120 includes various processors (e.g., 258, 264, 266, and 280), antennas 252*a-r* (collectively 252), transceivers 254*a-r* (collectively 254), which include modulators and demodulators, and other aspects, which enable wireless transmission of data (e.g., retrieved from data source 262) and wireless reception of data (e.g., provided to data sink 260). UE 120 includes controller/processor 280, which may be configured to implement various functions described herein related to wireless communications.

For an example downlink transmission, BS 110 includes a transmit processor 220 that may receive data from a data source 212 and control information from a controller/processor 240. The control information may be for the physical broadcast channel (PBCH), the physical control format indicator channel (PCFICH), the physical hybrid automatic repeat request (HARQ) indicator channel (PHICH), the physical downlink control channel (PDCCH), the group common PDCCH (GC PDCCH), and/or other channels. The data may be for the physical downlink shared channel (PDSCH), in some examples.

Transmit processor 220 may process (e.g., encode and symbol map) the data and control information to obtain data symbols and control symbols, respectively. Transmit processor 220 may also generate reference symbols, such as for the primary synchronization signal (PSS), the secondary synchronization signal (SSS), the PBCH demodulation reference signal (DMRS), or the channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

UE 120 includes antennas 252a-252r that may receive the downlink signals from the BS 110 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 120 to a data sink 260, and provide decoded control information to a controller/processor 280.

For an example uplink transmission, UE 120 further includes a transmit processor 264 that may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 110.

At BS 110, the uplink signals from UE 120 may be received by antennas 234a-234t, processed by the demodulators in transceivers 232a-232t, detected by a MIMO detector 236 if applicable, and further processed by a receive processor 238 to obtain decoded data and control information sent by UE 120. Receive processor 238 may provide the decoded data to a data sink 239 and the decoded control information to the controller/processor 240. Memories 242 and 282 may store data and program codes (e.g., processor-executable instructions, computer-executable instructions) for BS 110 and UE 120, respectively. Scheduler 244 may schedule UEs for data transmission on the downlink and/or uplink.

In various aspects, BS 110 may be described as transmitting and receiving various types of data associated with the methods described herein. In these contexts, "transmitting"

may refer to various mechanisms of outputting data, such as outputting data from data source 212, scheduler 244, memory 242, transmit processor 220, controller/processor 240, TX MIMO processor 230, transceivers 232a-t, antenna 234a-t, and/or other aspects described herein. Similarly, "receiving" may refer to various mechanisms of obtaining data, such as obtaining data from antennas 234a-t, transceivers 232a-t, RX MIMO detector 236, controller/processor 240, receive processor 238, scheduler 244, memory 242, a network interface, and/or other aspects described herein.

In various aspects, UE 120 may likewise be described as transmitting and receiving various types of data associated with the methods described herein. In these contexts, "transmitting" may refer to various mechanisms of outputting data, such as outputting data from data source 262, memory 282, transmit processor 264, controller/processor 280, TX MIMO processor 266, transceivers 254a-t, antenna 252a-t, and/or other aspects described herein. Similarly, "receiving" may refer to various mechanisms of obtaining data, such as obtaining data from antennas 252a-t, transceivers 254a-t, RX MIMO detector 256, controller/processor 280, receive processor 258, memory 282, and/or other aspects described herein.

In some aspects, a processor may be configured to perform various operations, such as those associated with the methods described herein, and transmit (output) data to or receive (obtain) data from another interface that is configured to transmit or receive, respectively, the data.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

FIG. 3 depicts an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340, as well as the Near-RT RICs 325, the Non-RT RICs 315 and the SMO Framework 305) may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over-the-air (OTA) communications with one or more UEs 120. In some implementations, real-time and non-real-time aspects of control and user plane communications with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, artificial intelligence/machine learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figures 4A, 4B, 4C, 4D:
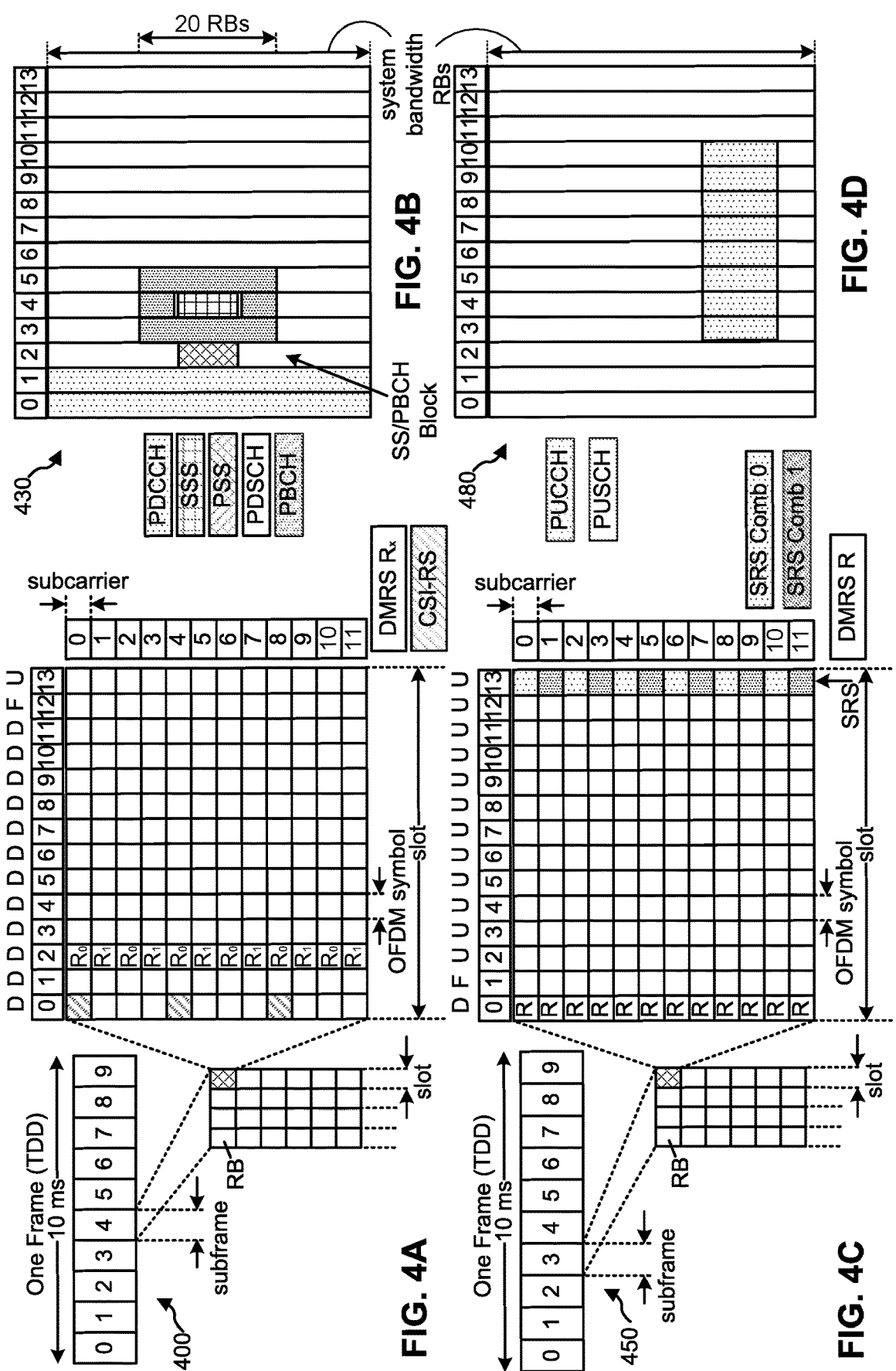
FIGS. 4A, 4B, 4C, and 4D depict aspects of data structures for a wireless communications network, in accordance with the present disclosure.

FIGS. 4A, 4B, 4C, and 4D depict aspects of data structures for a wireless communications network, such as wireless communications network 100 of FIG. 1, in accordance with the present disclosure. FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and F is flexible for use between DL/UL. UEs may be configured with a slot format through a received slot format indicator (SFI) (dynamically through DL control information (DCI), or semi-statically/statically through RRC signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies ($\mu$) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and 2 slots/subframe. The subcarrier spacing and symbol length/duration are a function of the numerology. The subcarrier spacing may be equal to $2^{\mu} \times 15$ kHz, where $\mu$ is the numerology index, which may be selected from values 0 to 5. Accordingly, the numerology $\mu=0$ has a subcarrier spacing of 15 kHz and the numerology $\mu=5$ has a subcarrier spacing of 480 kHz. Other numerologies and subcarrier spacings may be used. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RSs) for a UE (e.g., UE 120). The RSs may include demodulation RSs (DMRSs) and/or channel state information reference signals (CSI-RSs) for channel estimation at the UE. The RSs may also include beam measurement RSs (BRSs), beam refinement RSs (BRRSs), and/or phase tracking RSs (PT-RSs).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., UE 120) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRSs. The physical broadcast channel (PBCH), which carries a master information block (MIB), may be logically grouped with the PSS and SSS to form a synchronization signal (SS)/PBCH block (SSB). The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRSs (indicated as R for one particular configuration, but other DMRS configurations are possible) for channel estimation at the base station. The UE may transmit DMRSs for the PUCCH and DMRSs for the PUSCH. The PUSCH DMRSs may be transmitted, for example, in the first one or two symbols of the PUSCH. The PUCCH DMRSs may be transmitted in different configurations depending on whether short or long PUCCHs are transmitted and depending on the particular PUCCH format used. UE 120 may transmit sounding reference signals (SRSs). The SRSs may be transmitted, for example, in the last symbol of a subframe. The SRSs may have a comb structure, and a UE may transmit SRSs on one of the combs. The SRSs may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 5:
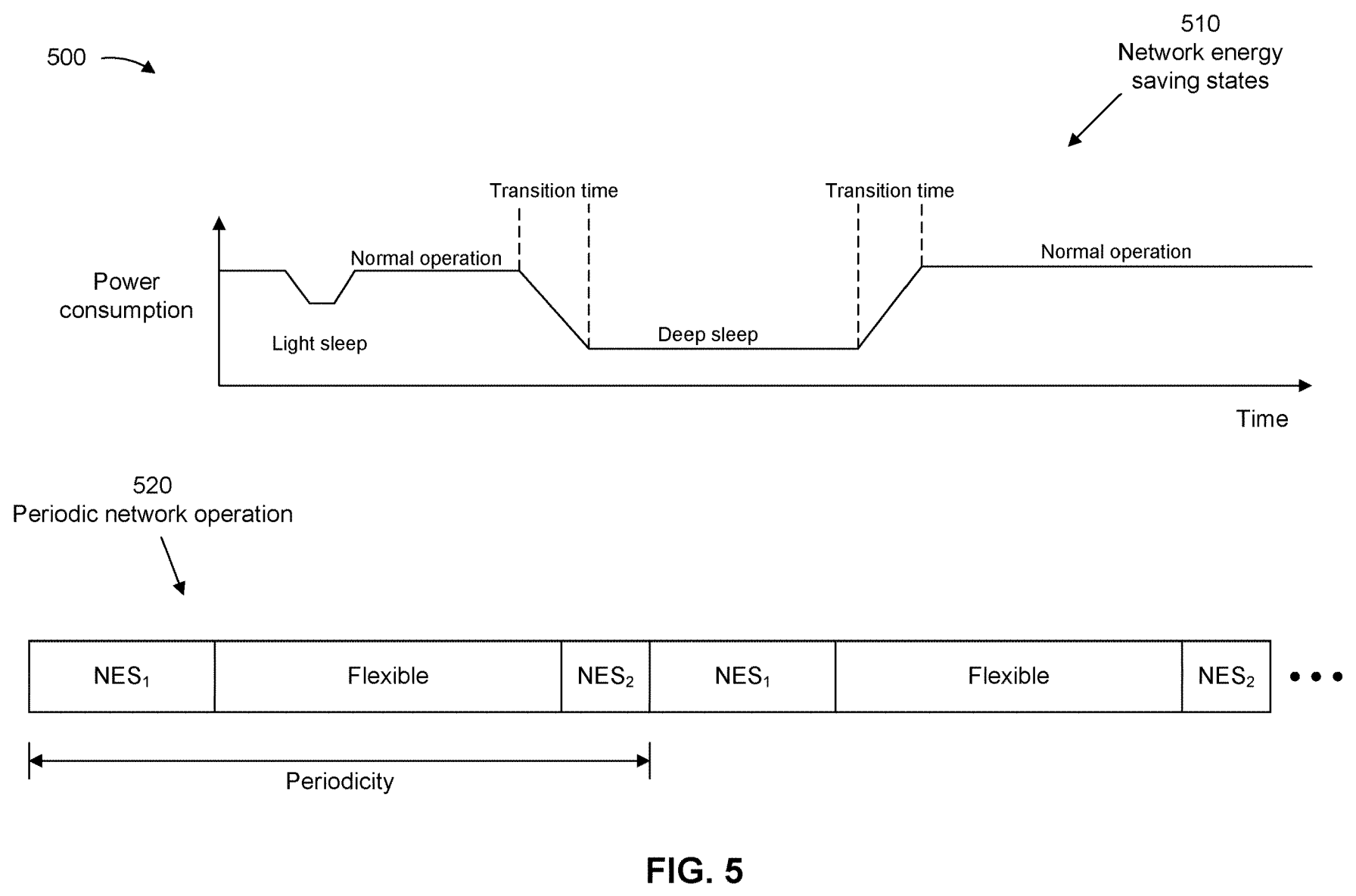

FIG. 5 is a diagram illustrating an example 500 of network operations to reduce energy consumption, in accordance with the present disclosure. Network energy saving and/or network energy efficiency measures are expected to have increased importance in wireless network operations for various reasons, including climate change mitigation, environmental sustainability, and network cost reduction. For example, although NR generally offers a significant energy efficiency improvement per gigabyte over previous generations (for example, LTE), new NR use cases that demand high data rates and/or the adoption of millimeter wave frequencies may require more network sites, greater network density, more network antennas, larger bandwidths, and/or more frequency bands, which could potentially lead to a more efficient wireless network that nonetheless has higher energy requirements and/or causes more emissions than previous wireless network generations. Furthermore, energy accounts for a significant proportion of the cost to operate a wireless network. For example, according to some estimates, energy costs are about one-fourth the total cost to operate a wireless network, and over 90% of network operating costs are spent on energy (for example, fuel and electricity). Most energy consumption and/or energy costs come from powering a RAN, which accounts for about half of the energy consumed by a wireless network. Accordingly, measures to increase network energy savings and/or network energy efficiency are important factors that may drive adoption and/or expansion of wireless networks.

One way to increase energy efficiency in a RAN may be to adapt network energy consumption models to achieve more efficient operation dynamically and/or semi-statically. For example, power consumption in a RAN can generally be split into a dynamic portion, in which power is consumed only when data transmission and/or reception is ongoing, and a static portion, in which power is consumed all of the time to maintain the operation of radio access devices even when data transmission and/or reception is not ongoing. Accordingly, one potential approach to improve network energy savings may be to adapt power consumption models from the network perspective by reducing relative energy consumption for downlink and/or uplink communication (for example, considering factors such as power amplifier (PA) efficiency, quantities of transceiver units (TxRUs), and/or network load, among other examples), enabling network sleep states and associated transition times, and/or defining appropriate reference parameters and/or configurations. For example, in some cases, different network energy saving (NES) states may be configured to enable granular adaptation of transmission and/or reception to reduce energy consumption using techniques in time, frequency, spatial, and/or power domains, with potential support and/or feedback from UEs and/or potential UE assistance information. However, network devices and UEs may need to exchange and/or coordinate information over network interfaces to control configurations, communication parameters, and/or UE behavior for each NES state, which can increase configuration complexity and/or signaling overhead. This may pose challenges because techniques to reduce network energy consumption should generally be designed to avoid having a large impact on key performance indicators (KPIs) related to network and/or UE performance (for example, spectral efficiency, latency, UE power consumption, and/or complexity, among other examples).

Accordingly, as shown in FIG. 5, a network entity may be configured to operate in different NES states 510 over time, where each NES state 510 may use one or more techniques to adapt transmission and/or reception in time, frequency, spatial, and/or power domains. A NES state may be referred to herein as an energy state. A wireless communication device (e.g., a programmable logic controller (PLC) or a transmitting UE) can also use a NES state, which may adapt transmission and/or reception of the wireless communication device in time, frequency, spatial, and/or power domains. For example, as shown in FIG. 5, the NES states 510 of the network entity may include a normal operation mode (which may also be referred to as a legacy mode or a default mode) and one or more sleep modes that may be associated with a lower power consumption than the normal operation mode. In general, a network node may transition between different NES states 510 to save power and maintain network operation (for example, minimizing impact on KPIs such as spectral efficiency, capacity, user perceived throughput (UPT), latency, UE power consumption, complexity, handover performance, call drop rate, initial access performance, and/or service level agreement assurance). Furthermore, the network node may transition between different sleep modes based on traffic demands (for example, entering a light sleep mode when traffic demands are slightly lower than usual and/or entering a deep sleep mode when traffic demands are much lower than usual), and different sleep modes may be associated with different energy saving techniques (for example, one or more antenna panels, antenna ports, and/or RF chains may be turned off in the deep sleep mode but remain on in the light sleep mode). Accordingly, as shown in FIG. 5, the normal operation mode and the different sleep modes may vary in terms of power consumption and may be associated with different transition times (for example, a transition time to or from the deep sleep mode may be longer than a transition time to or from the light sleep mode).

In some cases, as described herein, an NES state 510 may generally correspond to a particular set of configurations, communication parameters, and/or UE behaviors. For example, an NES state 510 may include a set of configurations, communication parameters, and/or UE behaviors associated with one or more energy saving techniques that are implemented in the time, frequency, spatial, and/or power domain to reduce energy consumption. For example, a network node may be configured to not transmit an SSB to reduce energy consumption in a first NES state 510 (for example, an SSB-less NES state 510), and may be configured to employ other energy saving techniques such as turning off one or more antenna panels in a second NES state 510. Furthermore, in some cases, an NES state 510 may be associated with a set of configurations, communication parameters, and/or UE behaviors associated with the normal or legacy mode of network operation. Accordingly, because one design objective in energy-efficient wireless networks is to achieve more efficient operation dynamically and/or semi-statically, a network node may configure a semi-static pattern 520 to achieve network energy savings. For example, as shown in FIG. 5, the semi-static pattern 520 (for example, configured via RRC signaling) may include a sequence of NES states 510 that the network node follows in accordance with a given periodicity (for example, in FIG. 5, the network node operates in accordance with a first NES state, shown as $NES_1$, for a first time period, then operates in a flexible mode for a second time period, then operates in accordance with a second NES state, shown as $NES_2$, for a third time period, and the pattern then repeats). In cases where the semi-static pattern 520 includes a flexible mode, the network node may operate in accordance with any suitable NES state during the time period corresponding to the flexible mode (for example, depending on current traffic conditions), and the NES state that the network node selects for the time period corresponding to the flexible mode may be dynamically indicated to served UEs.

As indicated above, FIG. 5 is provided as an example. Other examples may differ from what is described with regard to FIG. 5.

Figure 6:
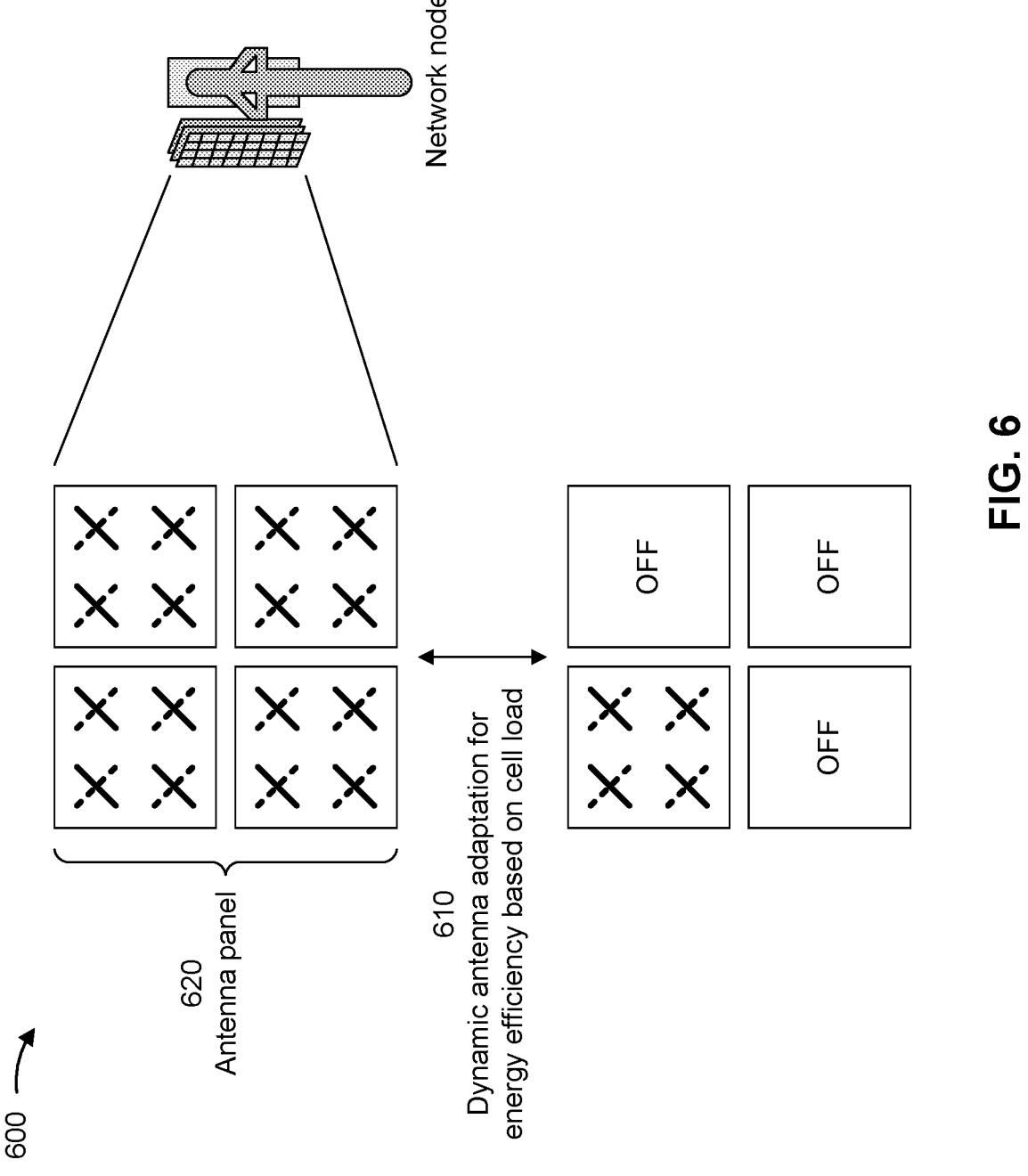
FIG. 6 is a diagram illustrating an example of dynamic network-side antenna adaptation in accordance with the present disclosure.

FIG. 6 is a diagram illustrating an example 600 of dynamic network-side antenna adaptation in accordance with the present disclosure. For various reasons, including climate change mitigation, environmental sustainability, and network cost reduction, network energy saving and/or network energy efficiency measures are expected to have increased importance in wireless network operations. For example, although NR generally offers a significant energy efficiency improvement per gigabyte over previous generations (for example, LTE), new NR use cases and/or the adoption of millimeter wave frequencies may require more network sites, more network antennas, larger bandwidths, and/or more frequency bands, which could potentially lead to more efficient wireless networks that nonetheless have higher energy requirements and/or cause more emissions than previous wireless network generations. Furthermore, energy accounts for a significant proportion of the cost to operate a wireless network. For example, according to some estimates, energy costs are about one-fourth the total cost to operate a wireless network, and over 90% of network operating costs are spent on energy (for example, fuel and electricity consumption). The largest proportion of energy consumption and/or energy costs are associated with a RAN, which accounts for about half of the energy consumption in a wireless network, with data centers and fiber transport accounting for smaller shares. Accordingly, measures to increase network energy savings and/or improve network energy efficiency are important factors that may drive adoption and/or expansion of wireless networks.

One way to increase energy efficiency in a RAN may be to use dynamic antenna adaptation in a network node that communicates using massive MIMO technology, which tends to consume significant power. For example, in an LTE network, a network node that supports massive MIMO technology may communicate using a baseband unit (BBU) (e.g., a DU and/or a CU) that processes baseband signals and communicates with a core network through a physical interface and a remote radio unit (RRU) (e.g., an RU and/or a DU) that performs transmit and receive radio frequency (RF) functions. In an LTE network, the per-cell power consumption (for example, in watts) is slightly larger for the RRU compared to the BBU, and the per-cell power consumption does not vary significantly with cell load. In an NR network, however, a network node that supports massive MIMO technology may communicate using a BBU and an active antenna unit (AAU) that consumes significantly more power than the BBU and the RRU associated with a network node in an LTE network (for example, because NR operates at a higher data rate and/or a higher bandwidth than LTE).

For example, in an NR network, the BBU and the AAU of a network node may consume 2.4 times the power of the BBU and RRU in an LTE network node when the cell load is low (for example, 0%), 2.6 times the power of the BBU and RRU in an LTE network node when the cell load is moderate (for example, 50%), or 6 times the power of the BBU and RRU in an LTE network node when the cell load is high (for example, 100%), where "cell load" in this context generally refers to the proportion of frequency resources within a carrier that are being utilized at a given time. Furthermore, in an NR network node, the AAU generally consumes significantly more power than the BBU, and the proportion of power consumption attributable to the AAU increases as the cell loading increases (for example, because the BBU has a relatively static power consumption regardless of cell loading, but the power consumption of the AAU increases when the cell loading increases). Accordingly, because the AAU represents the most power-hungry component in an NR network node that supports massive MIMO technology, improving energy efficiency of the AAU can have a significant impact on overall network energy consumption.

Accordingly, as shown in FIG. 6, in an operation 610, a network node that supports massive MIMO communication may enable dynamic antenna adaptation based on a current and/or predicted cell load in order to improve energy efficiency. For example, to enable massive MIMO communication, a network node may generally need to have multiple co-located antenna panels that each include multiple antenna ports. For example, FIG. 6 shows an example antenna panel 620 that includes four sub-panels, and each sub-panel includes several antenna ports (shown as dashed and solid intersecting lines) that each map to one or more physical antennas. For example, in FIG. 6, each diagonal line included in the antenna panel 620 corresponds to one antenna port and a color of the diagonal line represents a polarization of the antenna port (for example, solid diagonal lines may correspond to antenna ports with a horizontal polarization and dashed diagonal lines may correspond to antenna ports with a vertical polarization, or vice versa). In general, each antenna panel 620 is equipped with various power amplifiers and an antenna subsystem, which consume significant power. Accordingly, in order to save power or otherwise utilize energy more efficiently, the network node may dynamically adapt an antenna configuration based on a current and/or predicted cell load. For example, when the cell load is low or predicted to be low, the network node may turn one or more antenna panels, sub-panels, transceiver units (TxRUs), and/or antenna ports off to reduce energy consumption, and the network node may turn most or all antenna panels, sub-panels, TxRUs, and/or antenna ports on to increase capacity when the cell load is high or predicted to be high.

As indicated above, FIG. 6 is provided as an example. Other examples may differ from what is described with regard to FIG. 6.

Figure 7:
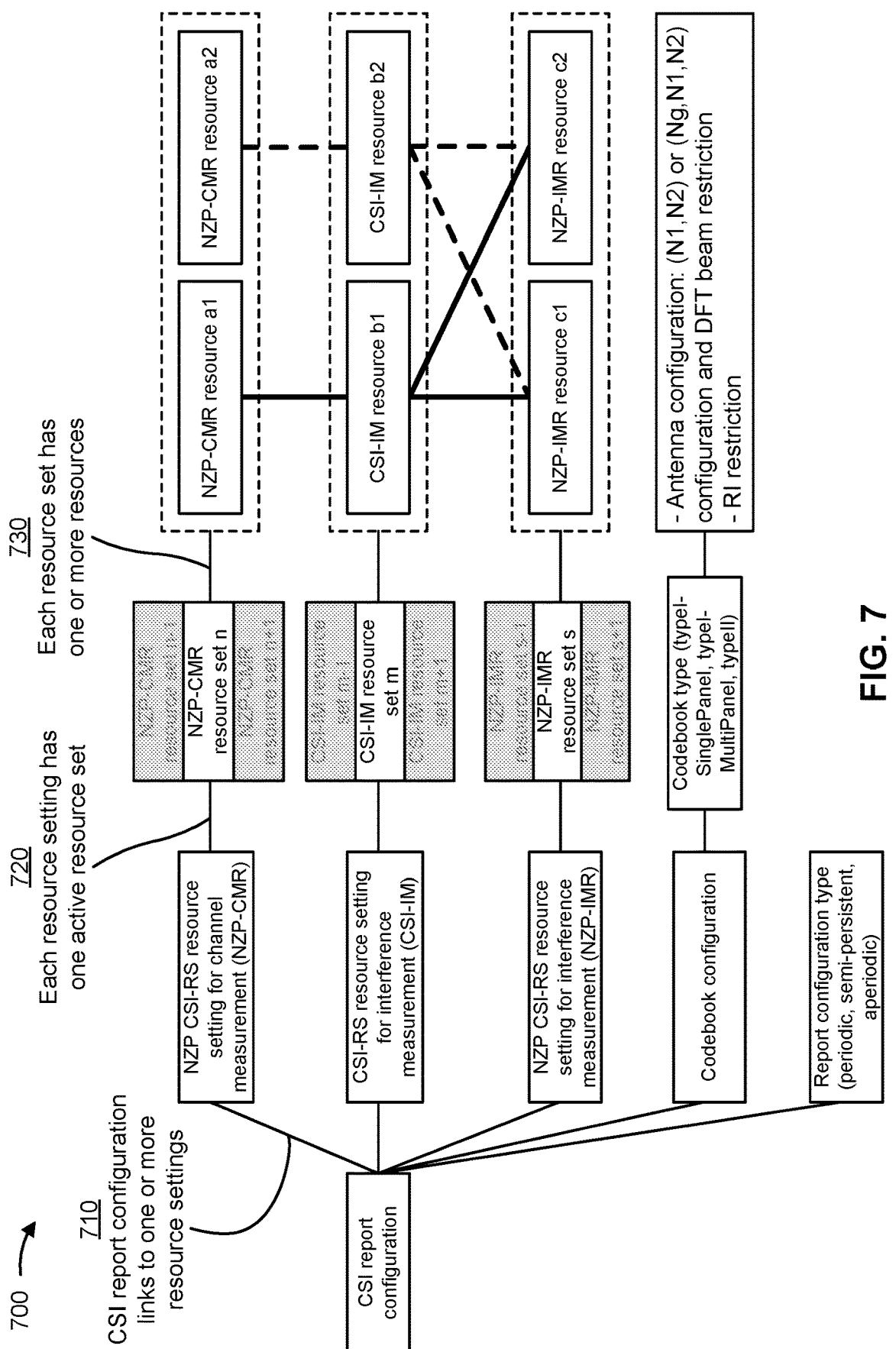
FIG. 7 is a diagram illustrating an example of a channel state information (CSI) reporting configuration, in accordance with various aspects of the present disclosure.

FIG. 7 is a diagram illustrating an example 700 of a CSI reporting configuration, in accordance with various aspects of the present disclosure.

In a wireless network, such as an LTE network, an NR network, and/or the like, a transmitter (e.g., a network entity) may transmit a reference signal, such as a channel state information reference signal (CSI-RS) which a receiver (e.g., a UE) may use to generate a channel state information (CSI) report. For example, the receiver may obtain one or more measurements from the reference signal to determine the CSI quantities to report, which may include a channel quality indicator (CQI), a precoding matrix indicator (PMI), a precoding type indicator (PTI), a rank indication (RI), and/or the like. Accordingly, the CSI report may provide the transmitter with information related to conditions associated with a wireless channel, which may represent a combined effect of scattering, fading, power decay with distance, and/or the like as a signal propagates in a path from the transmitter to the receiver. The transmitter can use the CSI report to select and/or adapt communication parameters (e.g., precoding, modulation and coding scheme (MCS) selection, beam selection, and/or the like) to enhance throughput, reliability, and/or the like. For example, when the CSI report indicates that the wireless channel has a low quality, the transmitter may select a more conservative or robust rate to ensure that data is successfully delivered. When the CSI report indicates that the wireless channel has a high quality, the transmitter may select a less conservative or robust (e.g., faster) rate to improve throughput and take advantage of the high quality wireless channel.

In general, the CSI report provided from the receiver to the transmitter is indicated to the receiver in a CSI report configuration, which may configure a periodic, semi-persistent, or aperiodic CSI report via higher-layer signaling (e.g., radio resource control (RRC) signaling), and subsequent lower-layer signaling (e.g., a medium access control (MAC) control element (MAC-CE) or downlink control information (DCI)) may trigger the CSI report (e.g., in the case of an aperiodic CSI report, as described below). For example, as shown in FIG. 7, and by reference number 710, a CSI report configuration may link to one or more resource settings that are further associated with a set of resources to be used to obtain the CSI quantities to be included in the CSI report. For example, as shown, the CSI report configuration may link to one resource setting (e.g., a non-zero power (NZP) CSI-RS resource setting for channel measurement (NZP-CMR) without a dedicated interference measurement resource), may link to two resource settings (e.g., the NZP-CMR resource setting and a CSI-RS resource setting for interference measurement (CSI-IM), the NZP-CMR resource setting and an NZP CSI-RS resource setting for interference measurement (NZP-IMR), and/or the like), may link to three resource settings (e.g., the NZP-CMR resource setting, the CSI-IM resource setting, and the NZP-IMR resource setting), and/or the like.

As further shown in FIG. 7, and by reference number 720, each resource setting can include multiple resource sets, only one of which may be active in a particular CSI report configuration corresponding to one CSI report. For example, in FIG. 7, the grayed-out resource sets are inactive in the corresponding CSI report configuration. As further shown in FIG. 7, and by reference number 730, each resource set has one or more resources. For example, in FIG. 7, NZP-CMR resource set n includes NZP-CMR resource a1 and NZP- CMR resource a2, CSI-IM resource set m includes CSI-IM resource b1 and CSI-IM resource b2, and NZP-IMR resource set s includes NZP-IMR resource c1 and NZP-IMR resource c2. In some aspects, different resources included in a particular NZP-CMR resource set may be associated with different transmission configuration indication (TCI) states (e.g., to define one or more quasi-co-location (QCL) relationships for one or more downlink reference signals associated with the corresponding resource).

As shown, a CSI report configuration may link to a codebook configuration. The codebook configuration may be associated with (e.g., link to) a configuration indicating a codebook type (e.g., TypeI-SinglePanel, typeI-MultiPanel, TypeII). The codebook configuration and/or the configuration indicating the codebook type may be associated with (e.g., link to) an antenna configuration, which may indicate one or more discrete Fourier transform (DFT) beam restrictions, and an RI restriction, which may indicate a maximum rank.

The CSI report configuration may be configured via RRC signaling per bandwidth part (BWP). A CSI report configuration, or information associated with (e.g., linked to) a CSI report configuration, may indicate various parameters that define how a CSI-RS is transmitted. For example, a resource set may include Ks resources that have the same number of CSI-RS ports. If Ks is equal to 1, each resource of the Ks resources may contain at most 32 CSI-RS ports. If Ks is equal to 2, each resource of the Ks resources may contain at most 16 CSI-RS ports. If Ks is between 3 and 8 (inclusive), each resource of the Ks resources may contain at most 8 CSI-RS ports. A resource containing P CSI-RS ports may include ports 3000 through 3000+(P−1) (that is, if P=5, the resource may include ports 3000 through 3004). As another example, an NZP-CSI-RS configuration linked to or included in a CSI report configuration may indicate one or more power offsets, such as a power offset (in dB) of an NZP CSI-RS resource element (RE) relative to a secondary synchronization signal (SSS) RE (powerControlOffsetSS) and a power offset (in dB) of a PDSCH RE relative to an NZP CSI-RS RE.

CSI-RS measurement and reporting may be subject to the configuration used to transmit the CSI-RS used for measurement and reporting. As noted above, networks may implement features that impact such configurations, such as dynamic transmit power adjustment and dynamic antenna adaptation. If a configuration relating to CSI measurement and reporting (e.g., a CSI report configuration and/or one or more of the other configurations described with regard to FIG. 7) is adapted, via explicit RRC signaling, each time such a configuration is impacted, overhead may be significant. Also, enhancements in CSI-RS measurement and reporting to support dynamic power and dynamic antenna adaptation may significantly increase the reporting overhead.

In practice, the number of different configurations for which a network entity may obtain CSI reporting may be limited. For example, the network entity may benefit from determining the channel qualities of a limited number of transmit power or antenna configurations, rather than all possible configurations of transmit power and/or active antennas. However, RRC reconfiguration of CSI measurement and reporting to match the limited number of configurations may involve significant signaling and RRC reconfiguration, which may be too slow for some applications of dynamic power and antenna configuration. Some techniques described herein provide a criterion-triggered approach for CSI-RS measurement and reporting. The criteria and expected UE behavior (e.g., parameters of a configuration for CSI-RS measurement and/or reporting) may be configured (e.g., via RRC signaling). Once a criterion is met (e.g., based on an event associated with the criterion causing a measurement or other value to satisfy a threshold, as described herein), the UE may perform CSI-RS measurement and reporting according to a configuration corresponding to the satisfied criterion. Thus, adaptability of CSI-RS to changing network configurations, such as transmit power or active antenna ports, is improved. Furthermore, by configuring the configurations and corresponding criteria, overhead and delay are reduced, relative to explicitly reconfiguring CSI measurement and reporting each time the network configuration changes.

As indicated above, FIG. 7 is provided as an example. Other examples may differ from what is described with regard to FIG. 7.

Figure 8:
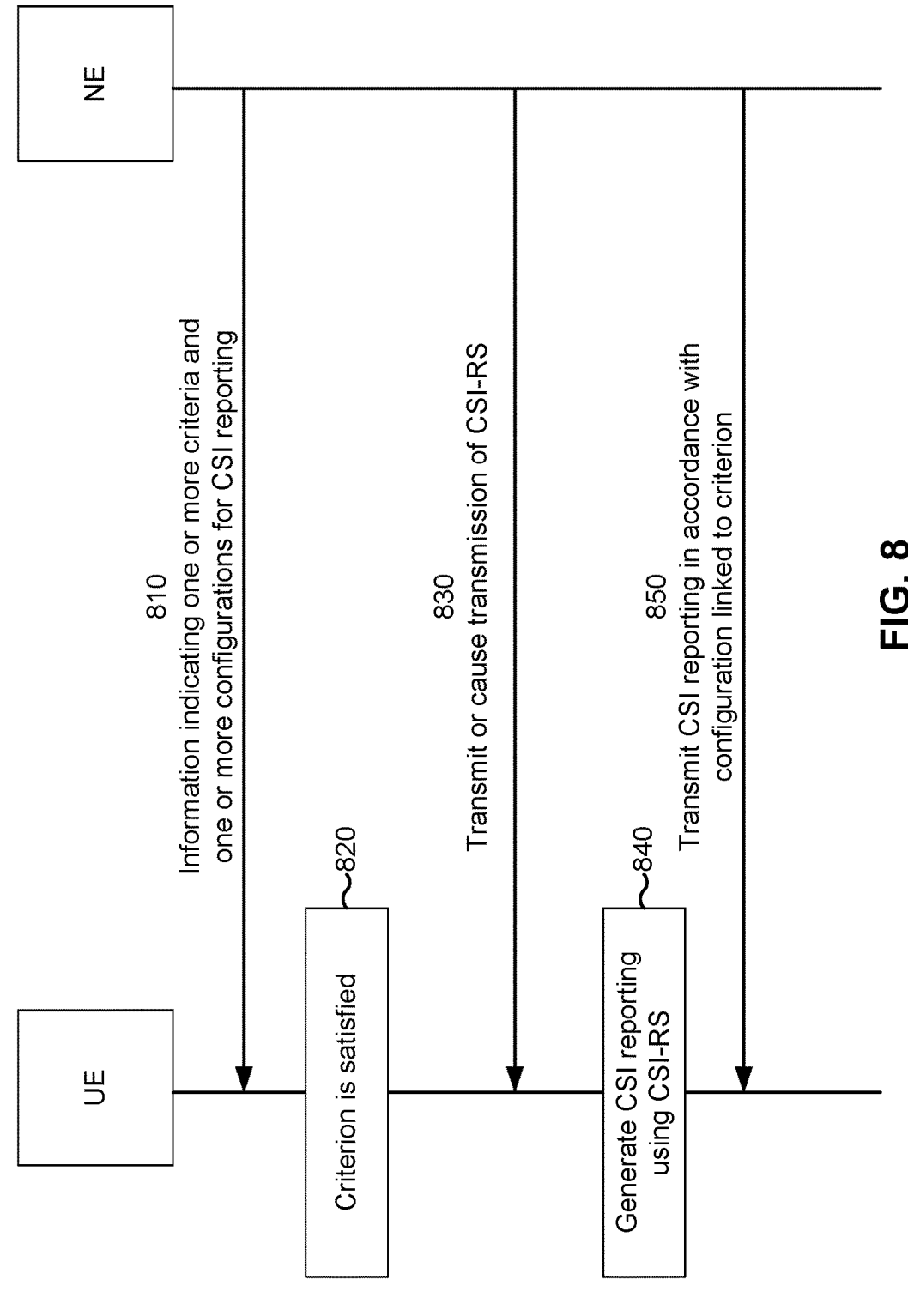
FIG. 8 is a diagram illustrating an example of signaling for criterion-driven CSI reporting.

FIG. 8 is a diagram illustrating an example 800 of signaling for criterion-driven CSI reporting. As shown, example 800 includes a UE (e.g., UE 120) and a network entity (e.g., base station 110, one or more nodes of a disaggregated base station as described with regard to FIG. 3). In some aspects, the network entity may include multiple network entities, such as a first network entity (e.g., a CU or a DU) that performs configuration actions (e.g., the transmission of information indicating one or more criteria and one or more corresponding configurations for CSI reporting), and a second network entity (e.g., a DU or an RU) that performs physical layer communication (e.g., the transmission of CSI-RSs, the reception of a CSI report). As used herein, "outputting," by a network entity, may include transmitting or causing another network entity to transmit. As used herein, "obtaining," by a network entity, may include receiving or causing another network entity to receive.

As shown by reference number 810, the network entity may output, and the UE may receive, information indicating one or more criteria and one or more configurations for CSI reporting. The one or more configurations may be linked to the one or more criteria (e.g., the information may indicate that a given configuration is linked to a given criterion, or a given configuration may include a given criterion, or a given criterion may include a given configuration), such as on a one-to-one basis, a one-to-many basis, a many-to-one basis, a many-to-many basis, or a combination thereof. If a given criterion 29 satisfied (as described below), the UE may generate CSI (e.g., measure a CSI-RS, determine CSI parameters such as RI/PMI/CQI, generate a CSI report) and/or transmit CSI reporting (e.g., one or more CSI reports) using a configuration that is linked to the given criterion. The example configurations are described in more detail below. As mentioned elsewhere herein, "satisfying a threshold" can include being greater than the threshold, less than the threshold, greater than or equal to the threshold, or less than or equal to the threshold, depending on the context.

A criterion may be satisfied based on an event. An event may include, for example, a threshold number of iterations of PDSCH decoding, a measurement or CSI parameter satisfying a threshold value, or the like. For example, the criterion may indicate a PDSCH decoding threshold. In some aspects, the PDSCH threshold may indicate a number of iterations performed by the UE to decode a PDSCH (e.g., a reference PDSCH, which is a PDSCH used to determine whether a criterion is satisfied). If the number of iterations satisfies the PDSCH threshold (in one example, if the number of iterations is greater than or equal to the PDSCH threshold, or if the number of iterations is lower than the PDSCH threshold), then the UE may transmit CSI reporting according to a configuration linked to the criterion indicating the PDSCH threshold. In some aspects, the PDSCH threshold may indicate a log likelihood ratio (LLR) value, such as an average LLR value or an absolute value of an average LLR value, which is a measure of confidence in decoding of the PDSCH. If the LLR value satisfies the PDSCH threshold (in one example, if the LLR value is greater than or equal to the PDSCH threshold, or if the LLR value is lower than the PDSCH threshold), then the UE may transmit CSI reporting according to a configuration linked to the criterion indicating the PDSCH threshold. In some aspects, the PDSCH threshold may indicate a bit error rate (BER) value, such as an average BER value or an absolute value of an average BER value, which is a measure of confidence in decoding of the PDSCH. If the LLR value satisfies the PDSCH threshold (in one example, if the BER value is greater than or equal to the PDSCH threshold, or if the BER value is lower than the PDSCH threshold), then the UE may transmit CSI reporting according to a configuration linked to the criterion indicating the PDSCH threshold. Determining that a criterion is satisfied (such as based on a PDSCH threshold or a CSI-RS measurement threshold, as described below) may be referred to as determining or assuming that an event associated with the criterion is triggered.

In some aspects, the criterion may indicate a CSI-RS measurement threshold. A CSI-RS measurement threshold may indicate a threshold for a parameter determined by measuring a CSI-RS or derived from information determined by measuring a CSI-RS (referred to as an anchor CSI-RS measurement). For example, a CSI-RS measurement threshold may indicate a threshold CQI value, a threshold PMI value, a threshold RI value, or a combination thereof (e.g., a vector indicating two or more of a threshold CQI value, a threshold PMI value, or a threshold RI value). If the CSI-RS measurement threshold is satisfied, then the UE may transmit CSI reporting in accordance with a configuration linked to the criterion defining the CSI-RS measurement threshold. For example, if a CQI value, a PMI value, an RI value, or a combination thereof is lower than the CSI-RS measurement threshold (or is higher than the measurement threshold), then the UE may transmit CSI reporting in accordance with a configuration that is linked to the CSI-RS measurement threshold. Defining the criterion according to the CSI-RS measurement threshold may indicate, to the UE, the channel's quality based on a given CSI-RS anchor configuration with a given power offset and a given antenna configuration. Thus, the UE can adjust the UE's configuration for CSI reporting according to the criterion based on the channel's quality.

A configuration may indicate one or more parameters. For example, a configuration may explicitly indicate a parameter (e.g., an explicit power control offset or an explicit number or identity of CSI-RS antenna ports, as described above). As another example, a configuration may indicate a modification of a baseline parameter (e.g., a parameter indicated by a CSI report configuration, a resource set, or another form of configuration). In some aspects, the configuration may indicate multiple different values of a parameter (e.g., multiple different power offsets, multiple different antenna configurations), where each value of the parameter is associated with (e.g., linked to) a different criterion (e.g., a different threshold, such as different threshold values of a PDSCH threshold or different threshold values of a CSI-RS measurement threshold). Thus, the UE can switch to different parameters for CSI reporting as channel conditions change, for example, due to changing transmit power or antenna configurations at the network entity.

As shown by reference number 820, the UE may determine that a criterion is satisfied. The criterion may include a criterion described with regard to reference number 810, above. In some aspects, the UE may determine that the criterion is satisfied after decoding a communication such as a PDSCH (e.g., in the case of a PDSCH threshold). In some aspects, the UE may determine that the criterion is satisfied after performing a CSI measurement or generating CSI reporting (e.g., in the case of a CSI-RS measurement threshold). In some aspects, the UE may determine that the criterion is satisfied prior to receiving or measuring a CSI-RS, such as the CSI-RS described with regard to reference number 830. In some other aspects, the UE may determine that the criterion is satisfied after receiving or measuring a CSI-RS. For example, the UE may interpret a received CSI-RS (e.g., may generate a CSI report or may perform retroactive measurement of the CSI-RS) once a criterion relating to the CSI-RS is satisfied.

As shown by reference number 830, the network entity may transmit or cause transmission of a CSI-RS. The network entity may transmit or cause transmission of the CSI-RS in accordance with a configuration at the network entity. For example, the configuration may indicate a transmit power of the CSI-RS, a resource in which the CSI-RS is transmitted, a number of antenna ports (e.g., CSI-RS antenna ports) used to transmit the CSI-RS, or the like.

As shown by reference number 840, the UE may generate CSI reporting using the CSI-RS. As shown by reference number 850, the UE may transmit, and the network entity may obtain, the CSI reporting in accordance with the configuration. For example, the UE may measure a resource on which the CSI-RS is transmitted in accordance with a configuration that is linked to a satisfied criterion. As another example, the UE may interpret a measurement (e.g., determine a CSI parameter such as an RI, an LI, a CQI, or another CSI parameter) using a parameter indicated by the configuration. In some aspects, the UE may generate multiple CSI reports. For example, each CSI report of the multiple CSI reports may use a different parameter (e.g., a different power control offset, a different number or configuration of CSI-RS antenna ports) corresponding to a satisfied criterion. As another example, a first CSI report may use a baseline parameter (e.g., unmodified by the satisfaction of a criterion) and a second CSI report may use a modified parameter linked to a satisfied criterion.

As a first example, a criterion may include a first PDSCH threshold of one decoding iteration and a second PDSCH threshold of three decoding iterations. The UE may perform CSI reporting based at least in part on a first configuration linked to the first PDSCH threshold and/or a second configuration linked to the second PDSCH threshold. For example, if the number of decoding iterations of a PDSCH (e.g., a reference PDSCH) is 1, the UE may transmit CSI reporting in accordance with the first configuration (e.g., using a power control offset that is increased by 3 dB) while if the number of decoding iterations of the PDSCH is 3, the UE may transmit CSI reporting in accordance with the second configuration (e.g., using a power control offset that is increased by 5 dB).

As a second example, a criterion may include a CSI-RS measurement threshold indicating a CQI of 3. The UE may perform CSI reporting based at least in part on a configuration linked to the CSI-RS measurement threshold of the CQI of 3. For example, if the CQI is lower than 3 (e.g., indicating a decreased channel quality), the UE may generate a first CSI report (e.g., a first set of parameters of a CSI report) using a first antenna configuration (e.g., a first number of CSI-RS antenna ports) and a second CSI report (e.g., a second set of parameters of a CSI report) using a second antenna configuration (e.g., a second number of CSI-RS antenna ports). The UE may transmit CSI reporting including the first CSI report and the second CSI report.

As indicated above, FIG. 8 is provided as an example. Other examples may differ from what is described with regard to FIG. 8.

Figure 9:
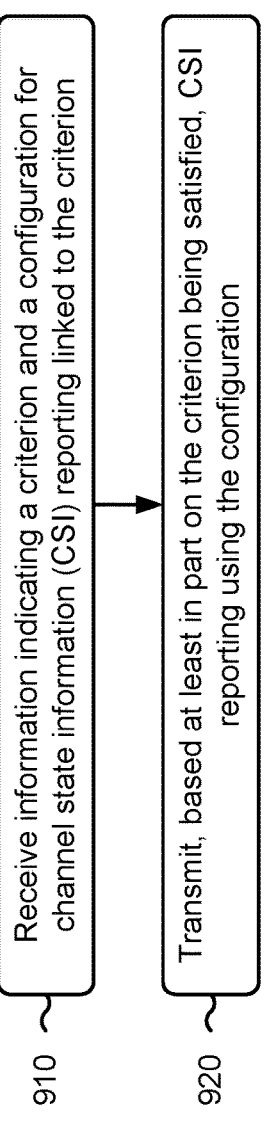
FIG. 9 shows a method for wireless communications by a UE.

FIG. 9 shows a method 900 for wireless communications by a UE, such as UE 120.

Method 900 begins at 910 with receiving information indicating a criterion and a configuration for CSI reporting linked to the criterion.

Method 900 then proceeds to step 920 with transmitting, based at least in part on the criterion being satisfied, CSI reporting using the configuration.

In a first aspect, the criterion indicates a physical downlink shared channel decoding threshold, and transmitting the CSI reporting further comprises transmitting the CSI reporting using the configuration based at least in part on the physical downlink shared channel decoding threshold being satisfied.

In a second aspect, alone or in combination with the first aspect, the criterion indicates a CSI-RS measurement threshold, and transmitting the CSI reporting further comprises transmitting the CSI reporting using the configuration based at least in part on the CSI-RS measurement threshold being satisfied.

In a third aspect, alone or in combination with one or more of the first and second aspects, transmitting, based at least in part on the criterion being satisfied, the CSI reporting using the configuration further comprises transmitting a CSI report according to a parameter indicated by the configuration.

In a fourth aspect, alone or in combination with one or more of the first through third aspects, the configuration indicates that the parameter is associated with the criterion.

In a fifth aspect, alone or in combination with one or more of the first through fourth aspects, the parameter is a power control offset.

In a sixth aspect, alone or in combination with one or more of the first through fifth aspects, the configuration indicates multiple different values of the parameter, wherein each value of the parameter is associated with a different criterion of a set of criteria including the criterion.

In a seventh aspect, alone or in combination with one or more of the first through sixth aspects, transmitting, based at least in part on the criterion being satisfied, the CSI reporting using the configuration further comprises transmitting, based at least in part on the criterion being satisfied, a CSI report according to a number of CSI-RS antenna ports indicated by the configuration.

In an eighth aspect, alone or in combination with one or more of the first through seventh aspects, transmitting, based at least in part on the criterion being satisfied, the CSI reporting using the configuration further comprises transmitting, based at least in part on the criterion being satisfied, multiple CSI reports according to two or more different parameters, wherein at least one parameter of the two or more different parameters is indicated by the configuration.

In one aspect, method 900, or any aspect related to it, may be performed by an apparatus, such as communications device 1100 of FIG. 11, which includes various components operable, configured, or adapted to perform the method 900.

Communications device 1100 is described below in further detail.

Note that FIG. 9 is just one example of a method, and other methods including fewer, additional, or alternative steps are consistent with this disclosure.

Figure 10:
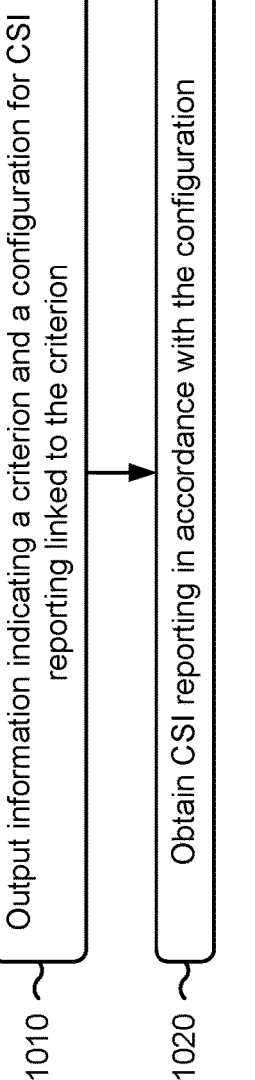
FIG. 10 shows a method for wireless communications by a network entity.

FIG. 10 shows a method 1000 for wireless communications by a network entity, such as BS 110, or a disaggregated base station as discussed with respect to FIG. 3.

Method 1000 begins at 1010 with outputting information indicating a criterion and a configuration for CSI reporting linked to the criterion.

Method 1000 then proceeds to step 1020 with obtaining CSI reporting in accordance with the configuration.

In a first aspect, the criterion indicates a physical downlink shared channel decoding threshold.

In a second aspect, alone or in combination with the first aspect, the criterion indicates a CSI-RS measurement threshold.

In a third aspect, alone or in combination with one or more of the first and second aspects, obtaining the CSI reporting in accordance with the configuration further comprises obtaining a CSI report according to a parameter indicated by the configuration.

In a fourth aspect, alone or in combination with one or more of the first through third aspects, the configuration indicates that the parameter is associated with the criterion.

In a fifth aspect, alone or in combination with one or more of the first through fourth aspects, the parameter is a power control offset.

In a sixth aspect, alone or in combination with one or more of the first through fifth aspects, the configuration indicates multiple different values of the parameter, wherein each value of the parameter is associated with a different criterion of a set of criteria including the criterion.

In a seventh aspect, alone or in combination with one or more of the first through sixth aspects, obtaining the CSI reporting in accordance with the configuration further comprises obtaining a CSI report according to a number of CSI-RS antenna ports indicated by the configuration.

In an eighth aspect, alone or in combination with one or more of the first through seventh aspects, obtaining the CSI reporting in accordance with the configuration further comprises obtaining multiple CSI reports according to two or more different parameters, wherein at least one parameter of the two or more different parameters is indicated by the configuration.

Figure 12:
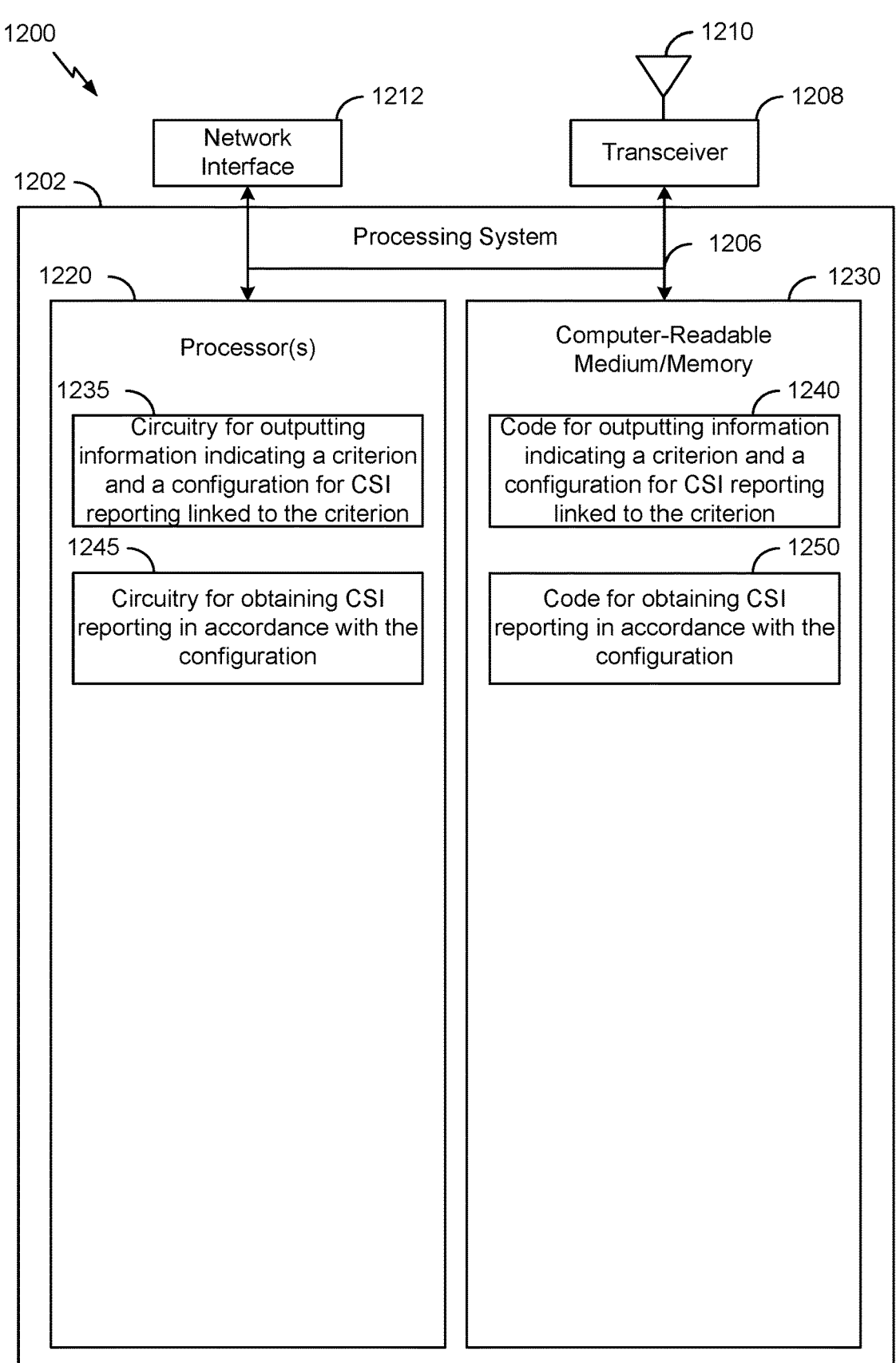
FIG. 12 is a diagram illustrating an example of an implementation of code and circuitry for a communications device, in accordance with the present disclosure.

In one aspect, method 1000, or any aspect related to it, may be performed by an apparatus, such as communications device 1200 of FIG. 12, which includes various components operable, configured, or adapted to perform the method 1000. Communications device 1200 is described below in further detail.

Note that FIG. 10 is just one example of a method, and other methods including fewer, additional, or alternative steps are consistent with this disclosure.

FIG. 11 is a diagram illustrating an example of an implementation of code and circuitry for a communications device 1100, in accordance with the present disclosure. The communications device 1100 may be a UE, or a UE may include the communications device 1100.

The communications device 1100 includes a processing system 1102 coupled to a transceiver 1108 (e.g., a transmitter and/or a receiver). The transceiver 1108 is configured to transmit and receive signals for the communications device 1100 via an antenna 1110, such as the various signals as described above. The processing system 1102 may be configured to perform processing functions for the communications device 1100, including processing signals received and/or to be transmitted by the communications device 1100.

The processing system 1102 includes one or more processors 1120. In various aspects, the one or more processors 1120 may be representative of one or more of receive processor 258, transmit processor 264, TX MIMO processor 266, and/or controller/processor 280, as described with respect to FIG. 2. The one or more processors 1120 are coupled to a computer-readable medium/memory 1130 via a bus 1106. In various aspects, the computer-readable medium/memory 1130 may be representative of memory 282, as described with respect to FIG. 2. In certain aspects, the computer-readable medium/memory 1130 is configured to store instructions (e.g., computer-executable code, processor-executable code) that when executed by the one or more processors 1120, cause the one or more processors 1120 to perform the method 900 described with respect to FIG. 9, or any aspect related to it. Note that reference to a processor performing a function of communications device 1100 may include one or more processors performing that function of communications device 1100.

As shown in FIG. 11, the communications device 1100 may include circuitry for receiving information indicating a criterion and a configuration for CSI reporting linked to the criterion (circuitry 1135).

As shown in FIG. 11, the communications device 1100 may include, stored in computer-readable medium/memory 1130, code for receiving information indicating a criterion and a configuration for CSI reporting linked to the criterion (code 1140).

As shown in FIG. 11, the communications device 1100 may include circuitry for transmitting, based at least in part on the criterion being satisfied, CSI reporting using the configuration (circuitry 1145).

As shown in FIG. 11, the communications device 1100 may include, stored in computer-readable medium/memory 1130, code for transmitting, based at least in part on the criterion being satisfied, CSI reporting using the configuration (code 1150).

Various components of the communications device 1100 may provide means for performing the method 900 described with respect to FIG. 9, or any aspect related to it. For example, means for transmitting, sending, or outputting for transmission may include the transceiver(s) 254 and/or antenna(s) 252 of the UE 120 and/or transceiver 1108 and antenna 1110 of the communications device 1100 in FIG. 11. Means for receiving or obtaining may include the transceiver(s) 254 and/or antenna(s) 252 of the UE 120 and/or transceiver 1108 and antenna 1110 of the communications device 1100 in FIG. 11.

FIG. 11 is provided as an example. Other examples may differ from what is described in connection with FIG. 11.

FIG. 12 is a diagram illustrating an example of an implementation of code and circuitry for a communications device 1200, in accordance with the present disclosure.

The communications device 1200 may be a network entity (such as BS 110 or a disaggregated base station as described with regard to FIG. 3), or a network entity may include the communications device 1200.

The communications device 1200 includes a processing system 1202 coupled to a transceiver 1208 (e.g., a transmitter and/or a receiver). The transceiver 1208 is configured to transmit and receive signals for the communications device 1200 via an antenna 1210, such as the various signals as described herein. The network interface 1212 is configured to obtain and send signals for the communications device 1200 via communications link(s), such as a backhaul link, midhaul link, and/or fronthaul link as described herein, such as with respect to FIG. 3. The processing system 1202 may be configured to perform processing functions for the communications device 1200, including processing signals received and/or to be transmitted by the communications device 1200.

The processing system 1202 includes one or more processors 1220. In various aspects, the one or more processors 1220 may be representative of one or more of receive processor 238, transmit processor 220, TX MIMO processor 230, and/or controller/processor 240, as described with respect to FIG. 2. The one or more processors 1220 are coupled to a computer-readable medium/memory 1230 via a bus 1206. In various aspects, the computer-readable medium/memory 1230 may be representative of memory 242, as described with respect to FIG. 2. In certain aspects, the computer-readable medium/memory 1230 is configured to store instructions (e.g., computer-executable code, processor-executable code) that when executed by the one or more processors 1220, cause the one or more processors 1220 to perform the method 1000 described with respect to FIG. 10, or any aspect related to it. Note that reference to a processor performing a function of communications device 1200 may include one or more processors performing that function of communications device 1200.

As shown in FIG. 12, the communications device 1200 may include circuitry for outputting information indicating a criterion and a configuration for CSI reporting linked to the criterion (circuitry 1235).

As shown in FIG. 12, the communications device 1200 may include, stored in computer-readable medium/memory 1230, code for outputting information indicating a criterion and a configuration for CSI reporting linked to the criterion (code 1240).

As shown in FIG. 12, the communications device 1200 may include circuitry for obtaining CSI reporting in accordance with the configuration (circuitry 1245).

As shown in FIG. 12, the communications device 1200 may include, stored in computer-readable medium/memory 1230, code for obtaining CSI reporting in accordance with the configuration (code 1250).

Various components of the communications device 1200 may provide means for performing the method 1000 described with respect to FIG. 10, or any aspect related to it. For example, means for transmitting, sending, or outputting for transmission may include the transceiver(s) 232 and/or antenna(s) 234 of the BS 110 and/or transceiver 1208 and antenna 1210 of the communications device 1200 in FIG. 12. Means for receiving or obtaining may include the transceiver(s) 232 and/or antenna(s) 234 of the BS 110 and/or transceiver 1208 and antenna 1210 of the communications device 1200 in FIG. 12.

FIG. 12 is provided as an example. Other examples may differ from what is described in connection with FIG. 12.

The following provides an overview of some Aspects of the present disclosure:

Aspect 1: A method of wireless communication performed by a user equipment (UE), comprising: receiving information indicating a criterion and a configuration for channel state information (CSI) reporting linked to the criterion; and transmitting, based at least in part on the criterion being satisfied, CSI reporting using the configuration.

Aspect 2: The method of Aspect 1, wherein the criterion indicates a physical downlink shared channel decoding threshold, and transmitting the CSI reporting further comprises transmitting the CSI reporting using the configuration based at least in part on the physical downlink shared channel decoding threshold being satisfied.

Aspect 3: The method of any of Aspects 1-2, wherein the criterion indicates a CSI reference signal (CSI-RS) measurement threshold, and transmitting the CSI reporting further comprises transmitting the CSI reporting using the configuration based at least in part on the CSI-RS measurement threshold being satisfied.

Aspect 4: The method of any of Aspects 1-3, wherein transmitting, based at least in part on the criterion being satisfied, the CSI reporting using the configuration further comprises transmitting a CSI report according to a parameter indicated by the configuration.

Aspect 5: The method of Aspect 4, wherein the configuration indicates that the parameter is associated with the criterion.

Aspect 6: The method of Aspect 4, wherein the parameter is a power control offset.

Aspect 7: The method of Aspect 4, wherein the configuration indicates multiple different values of the parameter, wherein each value of the parameter is associated with a different criterion of a set of criteria including the criterion.

Aspect 8: The method of any of Aspects 1-7, wherein transmitting, based at least in part on the criterion being satisfied, the CSI reporting using the configuration further comprises transmitting, based at least in part on the criterion being satisfied, a CSI report according to a number of CSI reference signal (CSI-RS) antenna ports indicated by the configuration.

Aspect 9: The method of any of Aspects 1-8, wherein transmitting, based at least in part on the criterion being satisfied, the CSI reporting using the configuration further comprises transmitting, based at least in part on the criterion being satisfied, multiple CSI reports according to two or more different parameters, wherein at least one parameter of the two or more different parameters is indicated by the configuration.

Aspect 10: A method of wireless communication performed by a network entity, comprising: outputting information indicating a criterion and a configuration for channel state information (CSI) reporting linked to the criterion; and obtaining CSI reporting in accordance with the configuration.

Aspect 11: The method of Aspect 10, wherein the criterion indicates a physical downlink shared channel decoding threshold.

Aspect 12: The method of any of Aspects 10-11, wherein the criterion indicates a CSI reference signal (CSI-RS) measurement threshold.

Aspect 13: The method of any of Aspects 10-12, wherein obtaining the CSI reporting in accordance with the configuration further comprises obtaining a CSI report according to a parameter indicated by the configuration.

Aspect 14: The method of Aspect 13, wherein the configuration indicates that the parameter is associated with the criterion.

Aspect 15: The method of Aspect 13, wherein the parameter is a power control offset.

Aspect 16: The method of Aspect 13, wherein the configuration indicates multiple different values of the parameter, wherein each value of the parameter is associated with a different criterion of a set of criteria including the criterion.

Aspect 17: The method of any of Aspects 10-16, wherein obtaining the CSI reporting in accordance with the configuration further comprises obtaining a CSI report according to a number of CSI reference signal (CSI-RS) antenna ports indicated by the configuration.

Aspect 18: The method of any of Aspects 10-17, wherein obtaining the CSI reporting in accordance with the configuration further comprises obtaining multiple CSI reports according to two or more different parameters, wherein at least one parameter of the two or more different parameters is indicated by the configuration.

Aspect 19: An apparatus for wireless communication at a device, comprising a processor; memory coupled with the processor; and instructions stored in the memory and executable by the processor to cause the apparatus to perform the method of one or more of Aspects 1-18.

Aspect 20: A device for wireless communication, comprising a memory and one or more processors coupled to the memory, the one or more processors configured to perform the method of one or more of Aspects 1-18.

Aspect 21: An apparatus for wireless communication, comprising at least one means for performing the method of one or more of Aspects 1-18.

Aspect 22: A non-transitory computer-readable medium storing code for wireless communication, the code comprising instructions executable by a processor to perform the method of one or more of Aspects 1-18.

Aspect 23: A non-transitory computer-readable medium storing a set of instructions for wireless communication, the set of instructions comprising one or more instructions that, when executed by one or more processors of a device, cause the device to perform the method of one or more of Aspects 1-18.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules, and circuits described in connection with the present disclosure may be implemented or performed with a general purpose processor, a digital signal processor (DSP), an application-specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices (e.g., a combination of a DSP and a microprocessor, a plurality of microprocessors, one or more microprocessors in conjunction with a DSP core, a system on a chip (SoC), or any other such configuration).

As used herein, the term "determining" encompasses a wide variety of actions. For example, "determining" may include calculating, computing, processing, deriving, investigating, looking up (e.g., looking up in a table, a database, or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or a processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment (UE) for wireless communication, comprising one or more processors, coupled to memory, configured to cause the UE to:
   receive information indicating a criterion and a configuration for channel state information (CSI) reporting linked to the criterion;
   perform a CSI reference signal (CSI-RS) measurement based on an event associated with the criterion being satisfied; and
   transmit, based at least in part on the criterion being satisfied, CSI reporting using the configuration,
   wherein to cause the UE to transmit the CSI reporting using the configuration, the one or more processors are configured to cause the UE to transmit, based at least in part on the criterion being satisfied, a CSI report according to a number of CSI-RS antenna ports indicated by the configuration.

2. A user equipment (UE) for wireless communication, comprising one or more processors, coupled to memory, configured to cause the UE to:

receive information indicating a criterion and a configuration for channel state information (CSI) reporting linked to the criterion;
   perform a CSI reference signal (CSI-RS) measurement based on an event associated with the criterion being satisfied; and
   transmit, based at least in part on the criterion being satisfied, CSI reporting using the configuration,
   wherein the criterion indicates a physical downlink shared channel decoding threshold.

3. The UE of claim 2, wherein to transmit the CSI reporting, the one or more processors are configured to cause the UE to transmit the CSI reporting using the configuration based at least in part on the physical downlink shared channel decoding threshold being satisfied.

4. A network entity for wireless communication, comprising one or more processors, coupled to memory, configured to cause the network entity:
   output information indicating a criterion and a configuration for channel state information (CSI) reporting linked to the criterion; and
   obtain CSI reporting in accordance with the configuration, wherein the CSI reporting is based on an event associated with the criterion causing a CSI reference signal (CSI-RS) measurement,
   wherein:
      the criterion indicates a physical downlink shared channel decoding threshold; or
      the one or more processors, to cause the network entity to obtain the CSI reporting in accordance with the configuration, are configured to cause the network entity to obtain a CSI report according to a number of CSI-RS antenna ports indicated by the configuration.

5. The network entity of claim 4, wherein the criterion indicates the physical downlink shared channel decoding threshold.

6. The network entity of claim 4, wherein the one or more processors, to cause the network entity to obtain the CSI reporting in accordance with the configuration, are configured to cause the network entity to obtain the CSI report according to the number of CSI-RS antenna ports indicated by the configuration.

7. A method of wireless communication performed by a user equipment (UE), comprising:
   receiving information indicating a criterion and a configuration for channel state information (CSI) reporting linked to the criterion;
   performing a CSI reference signal (CSI-RS) measurement based on an event associated with the criterion being satisfied; and
   transmitting, based at least in part on the criterion being satisfied, CSI reporting using the configuration,
   wherein transmitting the CSI reporting using the configuration comprises transmitting, based at least in part on the criterion being satisfied, a CSI report according to a number of CSI-RS antenna ports indicated by the configuration.

8. A method of wireless communication performed by a network entity, comprising:
   outputting information indicating a criterion and a configuration for channel state information (CSI) reporting linked to the criterion; and
   obtaining CSI reporting in accordance with the configuration, wherein the CSI reporting is based on an event associated with the criterion causing a CSI reference signal (CSI-RS) measurement, wherein:

the criterion indicates a physical downlink shared channel decoding threshold; or obtaining the CSI reporting in accordance with the configuration, comprises obtaining a CSI report according to a number of CSI-RS antenna ports indicated by the configuration.

9. The method of claim 8, wherein the criterion indicates the physical downlink shared channel decoding threshold.

10. The method of claim 8, wherein obtaining the CSI reporting in accordance with the configuration comprises obtaining the CSI report according to the number of CSI-RS antenna ports indicated by the configuration.

11. A method of wireless communication performed by a user equipment (UE), comprising:

receiving information indicating a criterion and a configuration for channel state information (CSI) reporting linked to the criterion;

performing a CSI reference signal (CSI-RS) measurement based on an event associated with the criterion being satisfied; and transmitting, based at least in part on the criterion being satisfied, CSI reporting using the configuration, wherein the criterion indicates a physical downlink shared channel decoding threshold.

12. The method of claim 11, wherein transmitting the CSI reporting comprises transmitting the CSI reporting using the configuration based at least in part on the physical downlink shared channel decoding threshold being satisfied.

\* \* \* \* \*